(12) United States Patent
Salgaonkar et al.

(10) Patent No.: US 11,556,349 B2
(45) Date of Patent: Jan. 17, 2023

(54) BOOTING A SECONDARY OPERATING SYSTEM KERNEL WITH RECLAIMED PRIMARY KERNEL MEMORY

(71) Applicant: International Business Machines Corporation, Armonk, NY (US)

(72) Inventors: Mahesh Jagannath Salgaonkar, Bangalore (IN); Ananth Narayan Mavinakayanahalli, Karnataka (IN); Kamalesh Babulal, Bangalore (IN); Aravinda Prasad, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/809,311

(22) Filed: Mar. 4, 2020

(65) Prior Publication Data
US 2021/0279069 A1 Sep. 9, 2021

(51) Int. Cl.
*G06F 9/00* (2006.01)
*G06F 9/4401* (2018.01)
*G06F 12/02* (2006.01)

(52) U.S. Cl.
CPC .......... *G06F 9/4408* (2013.01); *G06F 12/023* (2013.01); *G06F 2212/251* (2013.01)

(58) Field of Classification Search
CPC .... G06F 9/4408; G06F 9/4416; G06F 9/4406; G06F 9/45541; G06F 9/45558; H04L 67/06; H04L 67/1097
See application file for complete search history.

(56) References Cited

U.S. PATENT DOCUMENTS

| | | | | |
|---|---|---|---|---|
| 6,279,092 B1* | 8/2001 | Franaszek | ........... | G06F 12/0802 711/170 |
| 8,370,617 B2* | 2/2013 | Li | ......... | G06F 9/4406 713/1 |
| 2008/0228833 A1* | 9/2008 | Kano | ........... | G06F 16/2308 |
| 2008/0307188 A1* | 12/2008 | Franaszek | ......... | G06F 9/5016 711/E12.016 |
| 2012/0131380 A1 | 5/2012 | Horman et al. | | |

(Continued)

FOREIGN PATENT DOCUMENTS

CN 102929747 A 11/2012

OTHER PUBLICATIONS

Anonymous, "Method to reduce memory reservation to capture a Operating System dump", ip.com, IP.com No. IPCOM000255920D, Oct. 22, 2018, pp. 1-3.

*Primary Examiner* — Tammara R Peyton
(74) *Attorney, Agent, or Firm* — Kunzler Bean & Adamson

(57) ABSTRACT

Methods that boot a secondary operating system (O/S) kernel with reclaimed primary kernel memory are disclosed herein. One method includes booting, via a processor performing a boot algorithm, a secondary kernel for an O/S in response to a primary kernel for the O/S going offline, in which the secondary kernel is configured to be loaded to a reserved memory area. The method further includes reclaiming memory space from the primary kernel for use in booting the secondary kernel in response to a determination that the reserved memory area includes insufficient memory space for completing the boot algorithm. Also disclosed herein are apparatus, systems, and computer program products that can include, perform, and/or implement the methods for providing a secondary kernel that includes a reserved area in memory.

18 Claims, 19 Drawing Sheets

(56) References Cited

U.S. PATENT DOCUMENTS

2014/0324785 A1* 10/2014 Gupta .................. G06F 16/273
707/689
2016/0292030 A1 10/2016 Akirav et al.

* cited by examiner

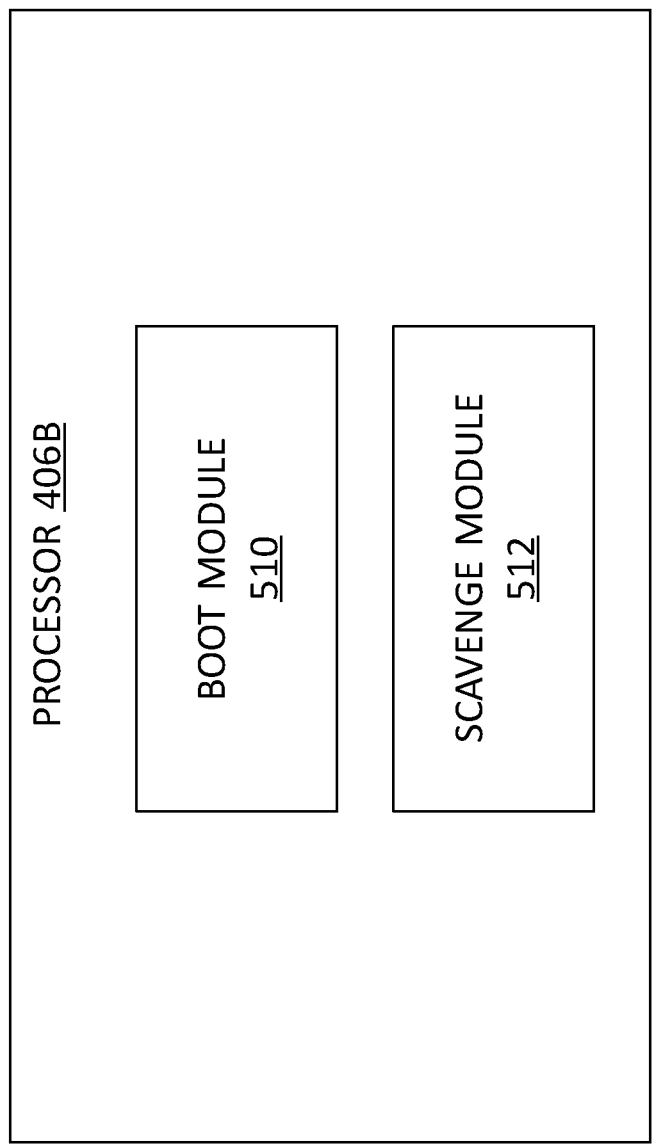

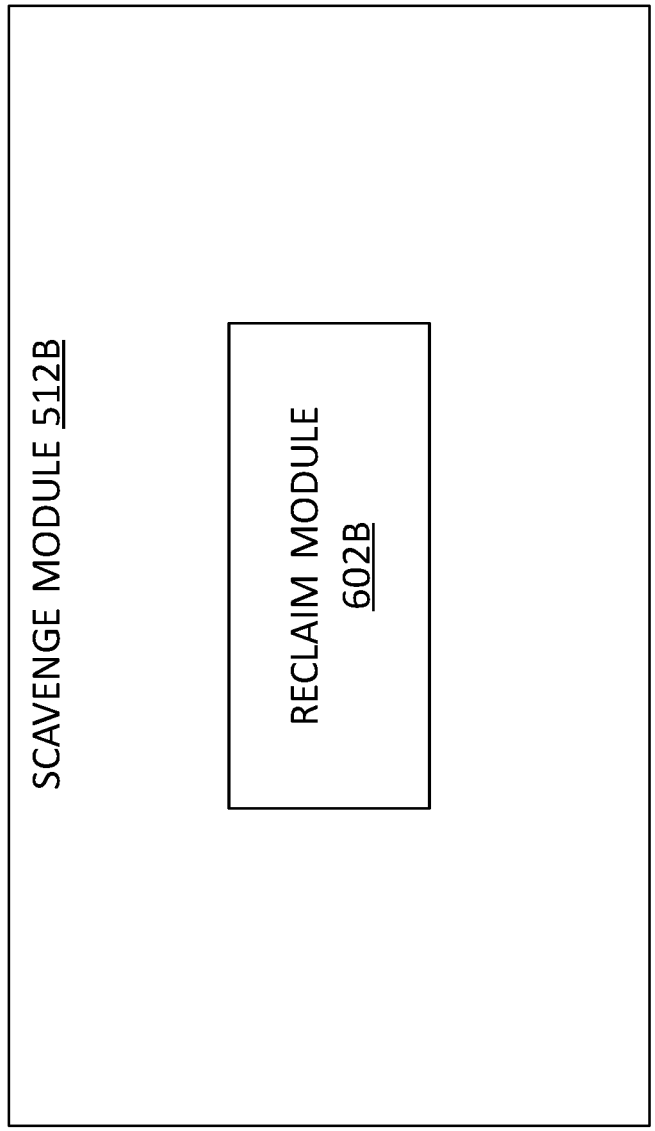

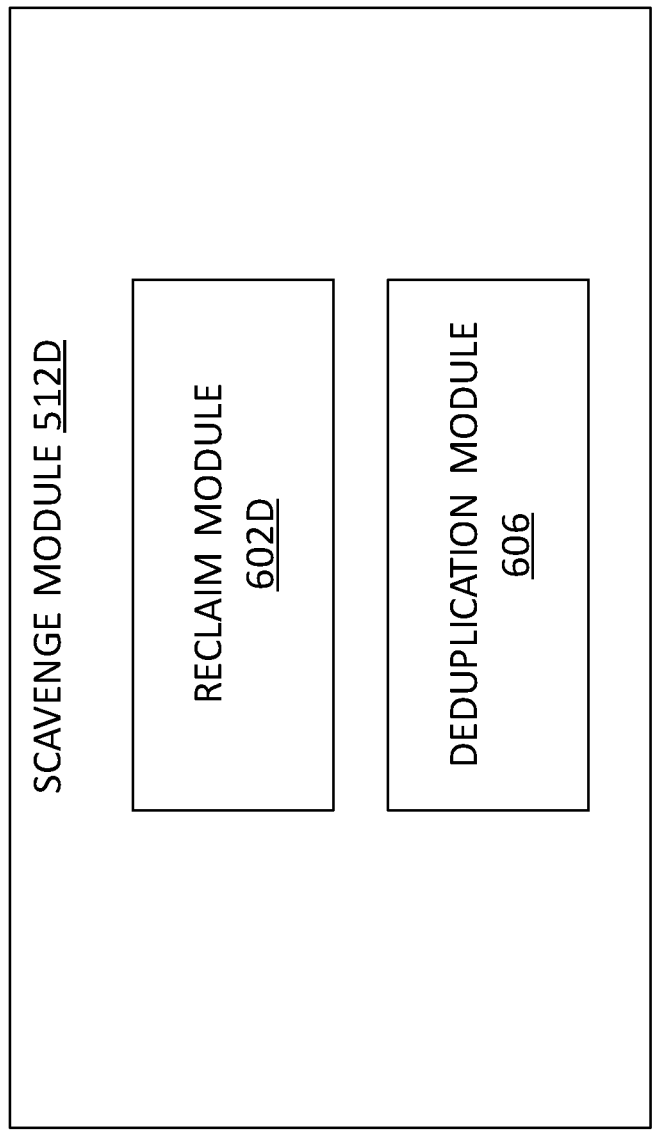

BOOTING A SECONDARY OPERATING SYSTEM KERNEL WITH RECLAIMED PRIMARY KERNEL MEMORY

FIELD

The subject matter disclosed herein relates to computing networks, systems, and apparatus and, more particularly, relates to booting a secondary operating system kernel with reclaimed primary kernel memory.

BACKGROUND

The kernel of an operating system (O/S) manages the O/S and a set of hardware resources and is the link between hardware and software in computing resources. A kernel can be susceptible to bugs due to programming errors and/or hardware failures. Kernel failures can be severe and may require, at a minimum, a reboot of the computing resource to address and/or fix the problem. In some instances, a kernel failure causes the kernel to go offline and/or renders the kernel inoperable for rebooting the computing resource.

Some conventional computing resources can include an initial kernel and a backup kernel that can facilitate rebooting the computing resource in the event that the initial kernel goes offline and/or is inoperable. However, conventional computing resources typically do not reserve enough memory space for the backup kernel to boot or reserve too much memory space for booting the backup kernel. For example, when a conventional computing resource does not have enough memory space reserved for the backup kernel to boot, the boot process for the backup kernel fails and the computing resource cannot be rebooted in the event that the initial kernel crashes. In another example, when a conventional computing resource reserves too much memory space for booting the backup kernel, the computing resource is not maximizing the use of its memory space and/or is wasting, by its non-use, otherwise usable memory space, which has considerable value in most computing resources.

BRIEF SUMMARY

Apparatus and systems that can boot a secondary operating system (O/S) kernel with reclaimed primary kernel memory are disclosed herein. One apparatus and/or system includes a boot module that boots, via a boot algorithm, a secondary kernel for an O/S in response to a primary kernel for the O/S going offline, in which the secondary kernel is configured to be loaded to a reserved memory area. The apparatus further includes a scavenge module that reclaims memory space from the primary kernel for use in booting the secondary kernel in response to a determination that the reserved memory area includes insufficient memory space for completing the boot algorithm. In additional or alternative embodiments, at least a portion of the modules includes a set of hardware circuits, a set of programmable hardware devices, and/or executable code stored on a set of non-transitory computer-readable storage media.

Methods that provide a secondary kernel for an O/S that includes an area reserved in memory are also provided. One method includes booting, via a processor performing a boot algorithm, a secondary kernel for an O/S in response to a primary kernel for the O/S going offline, in which the secondary kernel is configured to be loaded to a reserved memory area. The method further includes reclaiming memory space from the primary kernel for use in booting the secondary kernel in response to a determination that the reserved memory area includes insufficient memory space for completing the boot algorithm.

Also disclosed herein are computer program products including a computer-readable storage medium including program instructions embodied therewith that can boot a secondary O/S kernel with reclaimed primary kernel memory. The program instructions are executable by a processor and cause the processor to boot, via a boot algorithm, a secondary kernel for an O/S in response to a primary kernel for the O/S going offline, in which the secondary kernel is configured to be loaded to a reserved memory area. The program instructions further cause the processor to reclaim memory space from the primary kernel for use in booting the secondary kernel in response to a determination that the reserved memory area includes insufficient memory space for completing the boot algorithm.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIGS. 5A and 5B are block diagrams of various embodiments of a processor included in the computing resource of FIG. 4;

FIG. 6A through 6D are block diagrams of various embodiments of a scavenge module included in the processor of FIGS. 5A and 5B;

DETAILED DESCRIPTION

Figure 1:
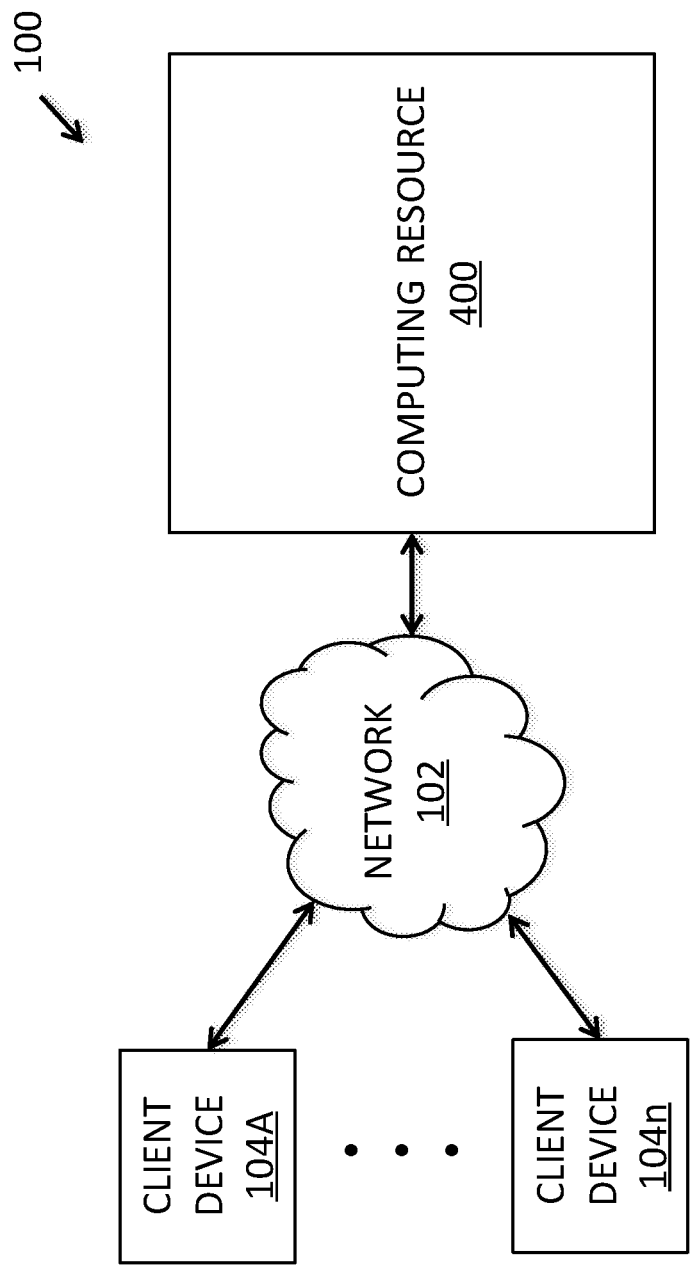
FIG. 1 is a block diagram of one embodiment of a computing network for booting a secondary operating system kernel with reclaimed primary kernel memory.

Disclosed herein are various embodiments providing apparatus, systems, computer program products, and methods for booting a secondary operating system kernel with reclaimed primary kernel memory. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium may be a tangible device that can retain and store instructions for use by an instruction execution device. The computer-readable storage medium may be, but is not limited to, for example, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a computing network 100 (or system) for booting a secondary operating system kernel with reclaimed primary kernel memory. At least in the illustrated embodiment, computing network 100 includes a network 102 connecting a set of client devices 104A through 104n (also simply referred individually, in various groups, or collectively as client device(s) 104) and a computing resource 400. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the computing resource 400 to be coupled to and/or in communication with one another and/or to share resources. In various embodiments, the network 102 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the computing resource 400 via the network 102. Each client device 104, as part of its respective operation, relies on sending I/O requests to the computing resource 400 to write data, read data, and/or modify data. Specifically, each client device 104 can transmit I/O requests to read, write, store, communicate, propagate, and/or transport instructions, data, computer programs, software, code, routines, etc., to the computing resource 400 and may include at least a portion of a client-server model. In general, the computing resource 400 can be accessed by the client device(s) 104 and/or communication with the computing resource 400 can be initiated by the client device(s) 104 through a network socket (not shown) utilizing one or more inter-process networking techniques.

While the computing network 100 illustrated in FIG. 1 includes two (2) client devices 104 (e.g., client devices 104A and 104n), the various embodiments of the computing network 100 are not limited to two client devices 104. That is, a computing network 100 may include one (1) client device 104 or a quantity of client devices 104 that is Greater than two client devices 104. In other words, various other embodiments of the computing network 100 may include any suitable of quantity of client devices 104.

A computing resource 400 may include any suitable hardware and/or software capable of performing computer processes, functions, and/or algorithms, as discussed elsewhere herein. In various embodiments, a computing resource 400 may include any suitable computing system and/or computing device that includes an operating system (O/S) and/or a bootable/rebootable computing resource 400. In some embodiments, the computing resource 400 includes hardware and/or software configured to execute instructions in one or more modules and/or applications for providing and/or including a secondary operating system kernel with an area reserved in memory, as discussed elsewhere herein.

Figure 2:
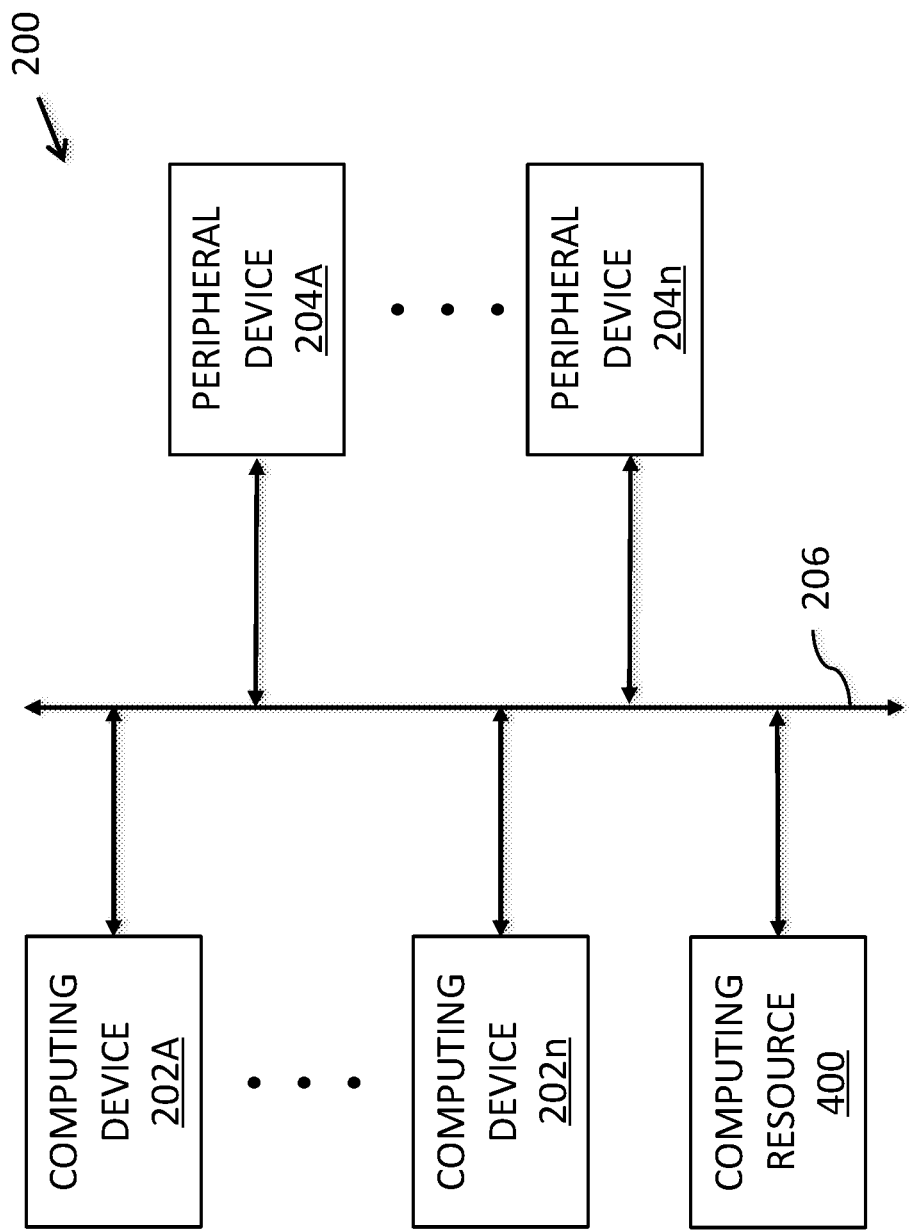
FIG. 2 is a block diagram of one embodiment of a computing system for booting a secondary operating system kernel with reclaimed primary kernel memory.

Referring to FIG. 2, FIG. 2 is a block diagram of one embodiment of a computing system 200 for booting a secondary operating system kernel with reclaimed primary kernel memory. At least in the illustrated embodiment, computing system 200 includes, among other components, a set of computing devices 202A through 202n (also simply referred individually, in various groups, or collectively as computing device(s) 202), a set of peripheral devices 204A through 204n (also simply referred individually, in various groups, or collectively as peripheral device(s) 204), and a computing resource 400 coupled to and/or in communication with one another via a communication line 206 (e.g., a wired and/or wireless communication line 206).

A computing device 202 can be any suitable computing hardware and/or software capable of accessing the computing resource 400 via the communication line 206. Each computing device 202, as part of its respective operation, relies on sending I/O requests to the computing resource 400 to write data, read data, and/or modify data. Specifically, each computing device 202 can transmit I/O requests to read, write, store, communicate, propagate, and/or transport instructions, data, computer programs, software, code, routines, etc., to the computing resource 400 and may include at least a portion of a client-server model. In general, the computing resource 400 can be accessed by the computing device(s) 202 and/or communication with the computing resource 400 can be initiated by the computing device(s) 202 utilizing one or more inter-process networking techniques.

While the computing system 200 illustrated in FIG. 2 includes two computing devices 202 (e.g., computing devices 202A and 202n), the various embodiments of the computing system 200 are not limited to two computing devices 202. That is, a computing system 200 may include one computing device 202 or a quantity of computing devices 202 that is greater than two computing devices 202. In other words, various other embodiments of the computing system 200 may include any suitable of quantity of computing devices 202.

A peripheral device 204 may include any suitable peripheral device 204 that is known or developed in the future that can communicate, cooperate, and/or function with the computing device(s) 202 and/or the computing resource 400. Example peripheral devices 204 include, but are not limited to, a printer, a monitor, an external drive, a memory device/system, a telephone device/system, a cellular device/system, a smartphone device/system, a tablet, a wearable device/system, hard drive, flash drive, a scanner, a modem, a router, a projector, and a facsimile (fax), etc., among other peripheral devices 204 and/or types of peripheral devices 204 that are possible and contemplated herein.

While the computing system 200 illustrated in FIG. 2 includes two peripheral devices 204 (e.g., peripheral devices 204A and 204n), the various embodiments of the computing system 200 are not limited to two peripheral devices 204. That is, a computing system 200 may include one peripheral device 204 or a quantity of peripheral devices 204 that is greater than two peripheral devices 204. In other words, various other embodiments of the computing system 200 may include any suitable of quantity of peripheral devices 204.

A computing resource 400 may include any suitable hardware and/or software capable of performing computer processes, functions, and/or algorithms, as discussed elsewhere herein. In various embodiments, a computing resource 400 may include any suitable computing system and/or computing device that includes an O/S and/or a bootable/rebootable computing resource 400. In some embodiments, the computing resource 400 includes hardware and/or software configured to execute instructions in one or more modules and/or applications for providing and/or including a secondary operating system kernel with an area reserved in memory, as discussed elsewhere herein.

Figure 3:
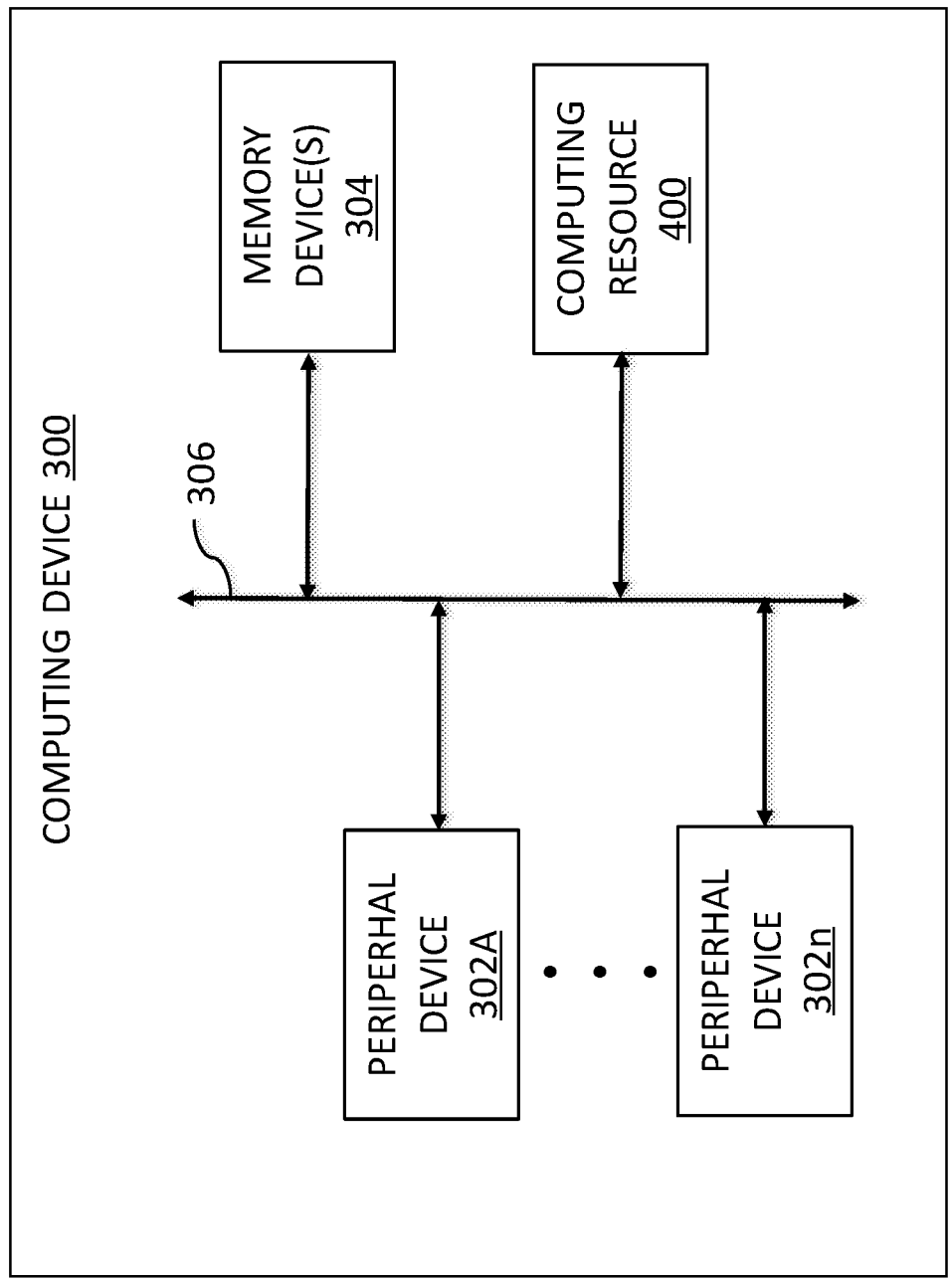
FIG. 3 is a block diagram of one embodiment of a computing device for booting a secondary operating system kernel with reclaimed primary kernel memory.

With reference to FIG. 3, FIG. 3 is a block diagram on one embodiment of a computing device 300 for booting a secondary operating system kernel with reclaimed primary kernel memory. At least in the illustrated embodiment, the computing device 300 includes, among other components, a set of peripheral devices 302A through 302n (also simply referred individually, in various groups, or collectively as peripheral device(s) 302), a set of memory devices 304, and a computing resource 400 coupled to and/or in communication with one another via a communication bus 306 (e.g., a wired and/or wireless communication line 206).

A peripheral device 302 may include any suitable peripheral device 302 that is known or developed in the future that can communicate, cooperate, and/or function with the memory device(s) 304 and/or the computing resource 400. Example peripheral devices 302 include, but are not limited to, a printer, a monitor, a touchscreen, an internal drive, an external drive, a memory device/system, a telephone device/system, a cellular device/system, a scanner, a modem, a router, a mouse, a keyboard, a smartphone device/system, a wearable device/system, hard drive, flash drive, optical disk drive, a video card, a tablet, a compact disk read-only memory (CD-ROM) drive, speakers, a microphone, a network interface card, a USB expansion card, a projector, a webcam, and a facsimile (fax), etc., among other peripheral devices 302 and/or types of peripheral devices 302 that are possible and contemplated herein.

While the computing device 300 illustrated in FIG. 3 includes two peripheral devices 302 (e.g., peripheral devices 302A and 302n), the various embodiments of the computing device 300 are not limited to two peripheral devices 302. That is, a computing device 300 may include one peripheral device 302 or a quantity of peripheral devices 302 that is greater than two peripheral devices 302. In other words, various other embodiments of the computing device 300 may include any suitable of quantity of peripheral devices 302.

A set of memory devices 304 (also simply referred to individually, in various groups, or collectively, as memory device(s) 304) may include any type of memory device that is known or developed in the future that is capable of storing data. A set of memory devices 304 may include any suitable quantity of memory devices 304 that allow/enable a computing resource 400 to perform its respective set of operations, set of functions, and/or set of applications, as discussed herein.

Figure 4:
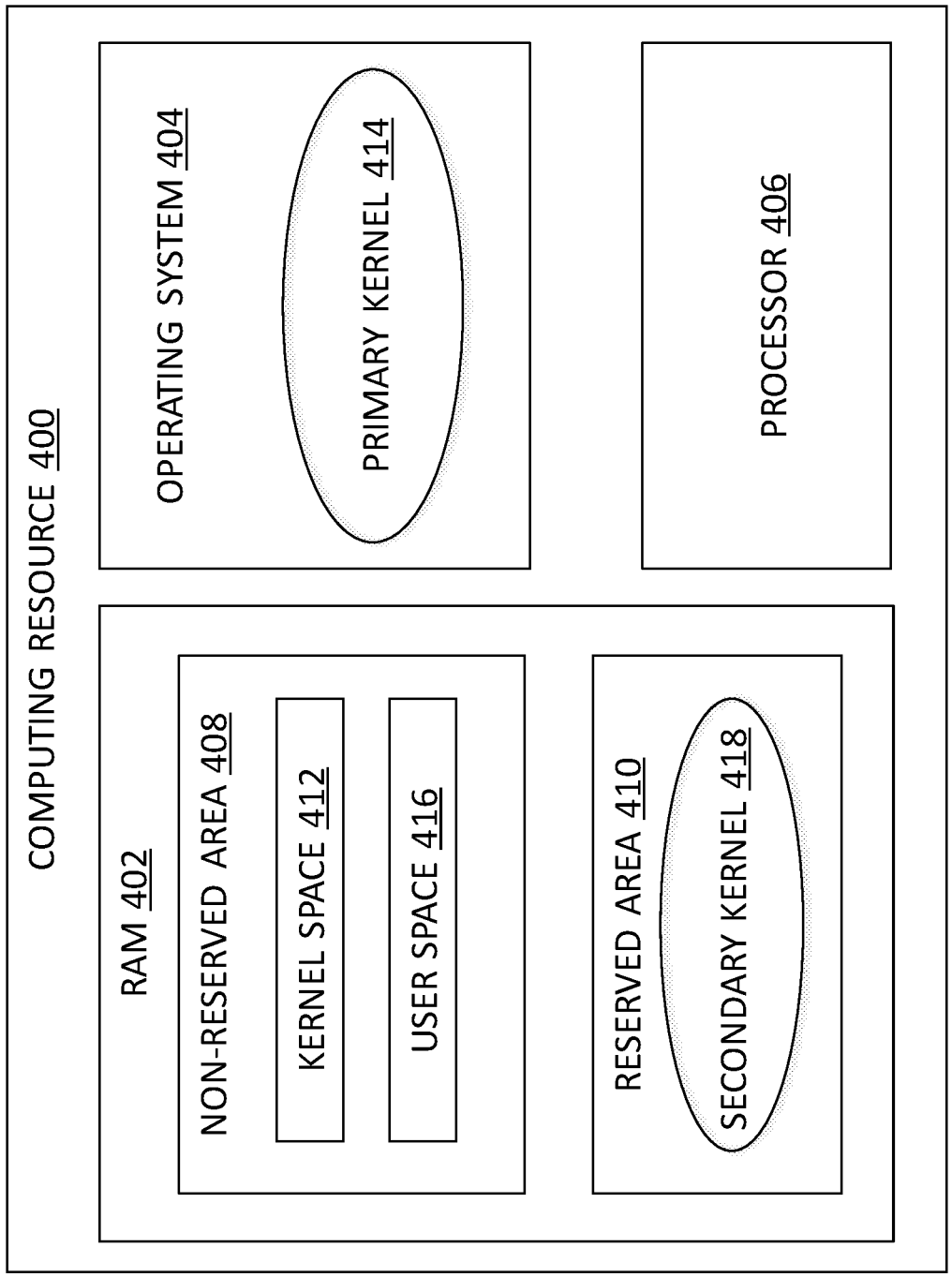
FIG. 4 is a block diagram of one embodiment of a computing resource included in the computing network of FIG. 1, the computing system of FIG. 2, or the computing device of FIG. 3.

A memory devices 304, in various embodiments, may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device (see e.g., a processor 406 in FIG. 4). Further, a memory device 304 may include non-volatile/persistent hardware and/or software configured to perform long-term data storage operations, including, but not limited to, data archiving, data backup, data mirroring, and/or data replicating data, etc., among other long-term data storage operations that are possible and contemplated herein. For instance, a memory device 304 may include non-volatile and/or persistent hardware and/or software configured for performing long-term data storage operations, which may include write operations, read operations, and/or read-write operations, etc., among other storage operations that are possible and contemplated herein.

In various embodiments, the memory device(s) 304 can be implemented as flash memory (e.g., a solid-state devices (SSD) or other non-volatile storage devices that store persistent data). Further, a memory devices 304, in some embodiments, may include non-transitory memory such as, for example, a dynamic random access memory (DRAM) device, a static random access memory (SRAM) device, a hard disk drive (HDD), storage tape (e.g., magnetic and/or virtual), and/or other types (e.g., non-volatile and/or persistent) of memory devices, etc., among other types of non-transitory memory that are possible and contemplated herein.

A computing resource 400 may include any suitable hardware and/or software capable of performing computer processes, functions, and/or algorithms. In various embodiments, a computing resource 400 may include any suitable computing system and/or computing device that includes an O/S and/or a bootable/rebootable computing resource 400. In some embodiments, the computing resource 400 includes hardware and/or software configured to execute instructions in one or more modules and/or applications for booting a secondary operating system kernel with reclaimed primary kernel memory, as discussed elsewhere herein.

Referring to FIG. 4, FIG. 4 is a block diagram of one embodiment of a computing resource 400 that can be included in the computing network 100, the computing system 200, and/or the computing device 300, discussed above. At least in the illustrated embodiment, a computing resource 400 includes, among other components, a random-access memory (RAM) 402, an O/S 404, and a processor 406 coupled to and/or in communication with one another.

RAM 402 may include any suitable hardware and/or software that can include and/or is configured to store computer-useable data and/or computer-readable data. In some embodiments, the RAM 402 is configured to store boot/reboot data, load and operate the O/S 404 therein (e.g., via a primary kernel 414), load and operate a secondary kernel 418), and reboot to the primary kernel 414 initiate and/or continue the various operations of the computing network 100, the computing system 200, the computing device 300, and/or the computing resource 400.

The RAM 402 may include any suitable size that is known or developed in the future. In various embodiments, RAM 402 may include any structure and/or configuration that can be divided and/or partitioned to include two or more areas and/or partitions. At least in the illustrated embodiment, the RAM 402 includes, among other components, a non-reserved area 408 (e.g., a set of free partitions or areas) and a reserved area 410 (e.g., a reserved partition or area).

The non-reserved area 408 may include any suitable size and/or amount of memory that allows an O/S 404 to perform the computer processes, functions, and/or algorithms for which it is designed. A non-reserved area 408, in various embodiments, includes memory space that can be partitioned and/or divided to include, among other components, a kernel space 412 utilized by the primary kernel 414 and a user space 416 associated with the primary kernel 414.

A kernel space 412 may include any suitable size and/or amount of space that allows and/or enables the code for the primary kernel 414 to be loaded, stored, and executed therefrom. In various embodiments, the kernel space 412 is partitioned into a set of kernel pages, which may include any suitable amount and/or quantity of kernel pages that can load, store, and execute the primary kernel 414 and/or various applications/functions performed by the primary kernel 414.

In some embodiments, available and/or free memory space (e.g., memory space that is empty and/or that is not being utilized) in the kernel space 412 can be reclaimed or scavenged by the secondary kernel 418, as discussed further elsewhere herein. In additional or alternative embodiments, the reclaimed or scavenged kernel space 412 (e.g., one or more kernel pages) can be utilized to boot a secondary kernel 418, as further discussed elsewhere herein.

A user space 416 may include any suitable size and/or amount of space that allows and/or enables user operations and/or applications to be loaded, stored, and executed therefrom. In various embodiments, the user space 416 is partitioned into a set of user pages, which may include any suitable amount and/or quantity of user pages that can load, store, and execute the user operations(s) and/or application(s).

In some embodiments, available and/or free memory space (e.g., memory space that is empty and/or that is not being utilized) in the user space 416 can be reclaimed or scavenged by the secondary kernel 418, as discussed elsewhere herein. In additional or alternative embodiments, at least a portion of the user space 416 (e.g., one or more user pages) or all of the user space 416 or user pages can be reclaimed and/or scavenged to boot the secondary kernel 418, as further discussed elsewhere herein.

In some embodiments, user space 416 (e.g., one or more user pages) can be made available and/or freed-up utilizing a compression algorithm/technique. In further embodiments, user space 416 (e.g., one or more user pages) can be made available and/or freed-up utilizing a deduplication algorithm/technique. The freed-up user space 416, in various embodiments, can be reclaimed and/or scavenged by the secondary kernel 418. Further, the secondary kernel 418 can utilize the freed-up user space 416 to boot the secondary kernel 418, as further discussed elsewhere herein.

A reserved area 410 may include an area and/or partition of the RAM 402 that can be reserved for use by a secondary kernel 418 (e.g., a backup kernel). The reserved area 410 may include any suitable size can enable/allow the secondary kernel 418 to be loaded thereon, partially booted therein, and at least partially executed therefrom.

In various embodiments, the reserved area 410 includes a fixed size and/or a predetermined amount of memory space. In some embodiments, the predetermined/fixed size is in the range of about 64 MB to about 512 MB, among other sizes, ranges, and/or sized ranges that are possible and contemplated herein. In additional or alternative embodiments, the reserved area 410 includes a maximum size of 512 MB, among other maximum sizes that are possible and contemplated herein.

In various embodiments, the predetermined/fixed size of the reserved area 410 is less than the amount of memory space used for booting the secondary kernel 418, as discussed elsewhere herein. In other words, booting the secondary kernel 418 uses more memory space than the amount of reserved memory space included in the reserved area 410.

To boot the secondary kernel 418, various embodiments provide, enable, and/or allow memory space in the RAM 402 to be scavenged, freed-up, or made available for booting the secondary kernel 418. In various embodiments, the memory space in the RAM 402 that can be scavenged, freed-up, or made available for booting the secondary kernel 418 can be included in the kernel space 412 and/or in the user space 416.

The secondary kernel 418, in various embodiments, is configured to facilitate rebooting the primary kernel 414 in the event that the primary kernel 414 experiences an error, goes offline, or otherwise becomes temporarily unavailable/inoperable, as discussed elsewhere herein. In some embodiments, the secondary kernel 418 includes and/or is configured to execute a boot algorithm configured to boot the secondary kernel 418 in response to a determination that the primary kernel 414 is unavailable and/or inoperable, as further discussed elsewhere herein.

An O/S 404 can include any suitable hardware and/or software that can manage a set of processes for the computing network 100, the computing system 200, the computing device 300, and/or the computing resource 400. As such, the O/S 404 can include any operating system that is known or developed in the future. In various embodiments, the O/S 404 includes a primary kernel 414.

The primary kernel 414 can include any suitable hardware and/or software that can boot/reboot an O/S 404. As such, the primary kernel 414 can include any hardware and/or code that is known or developed in the future capable of booting/rebooting the O/S 404.

In some embodiments, the primary kernel 414 includes a boot algorithm and uses the boot algorithm to boot the O/S 404. In further embodiments, the primary kernel 414 includes a set of permissions for accessing files and/or devices operated and/or managed by the computing network 100, the computing system 200, the computing device 300, and/or the computing resource 400, which permissions are initialized during boot of the O/S 404.

A processor 406, in various embodiments, may include any suitable hardware and/or software that can boot a secondary operating system kernel with reclaimed primary kernel memory. In further embodiments, the processor 406 reserves an area in memory (e.g., RAM) and partially boots the secondary operating system kernel from the reserved area in memory. In some embodiments, the secondary operating system kernel is booted in response to a primary operating system kernel experiencing an error, going offline, and/or otherwise becoming unavailable/inoperable.

Figure 5A:
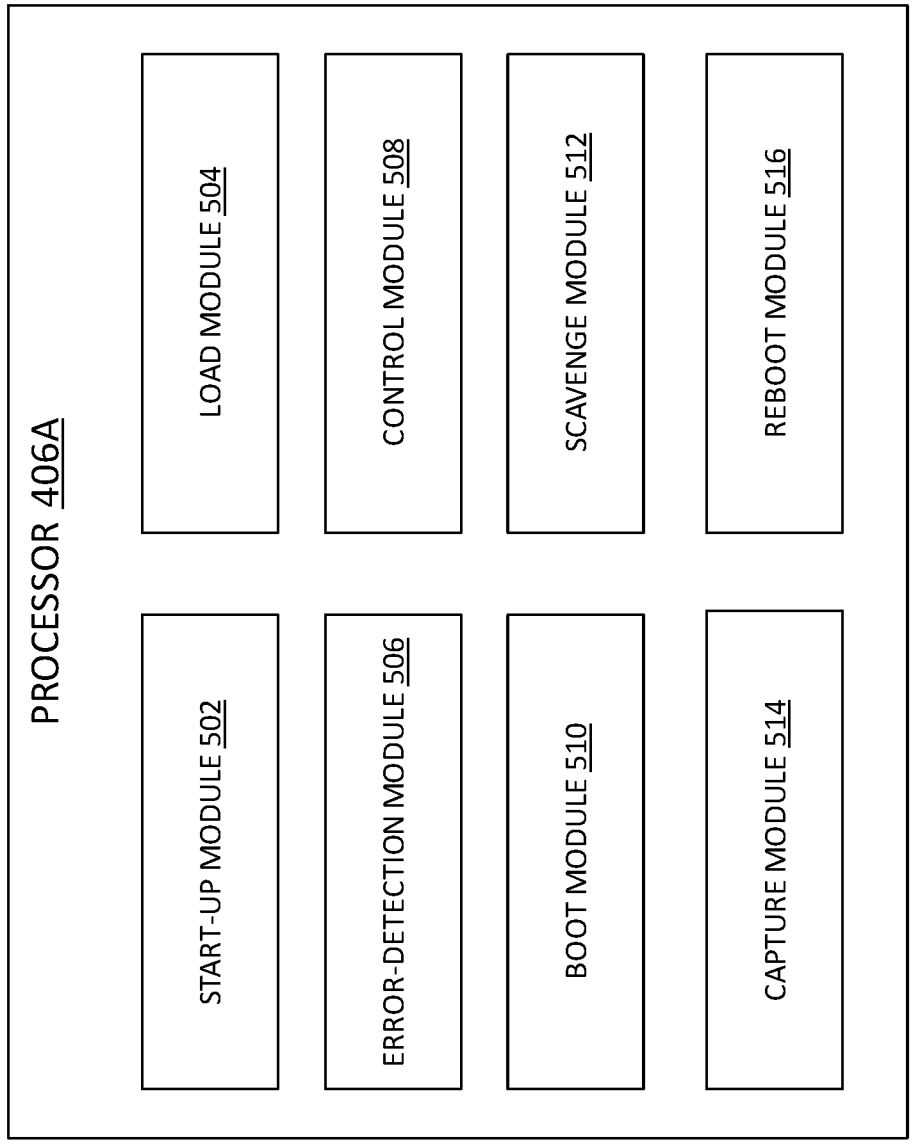

With reference to FIG. 5A, FIG. 5A is a block diagram of one embodiment of a processor 406A that can be included in and/or as a portion of a computing resource 400. At least in the illustrated embodiment, a processor 406A includes, among other components, a start-up module 502, a load module 504, an error-detection module 506, a control module 508, a boot module 510, a scavenge module 512, a capture module 514, and a reboot module 516 coupled to and/or in communication with one another.

A start-up module 502 may include any suitable hardware and/or software that can boot and/or facilitate starting an O/S 404. That is, the start-up module 502 is configured to load the O/S 404 (and the primary kernel 414) to the RAM 402 and begin executing the O/S 404 therefrom. Specifically, the primary kernel 414 is loaded to the kernel space 412 and executed therefrom to boot the O/S 404. In various embodiments, the start-up module 502 is configured to boot the O/S 404 via the primary kernel 414 executing a boot algorithm.

In additional or alternative embodiments, a start-up module 502 is configured to reserve memory space in the RAM 402 for a secondary kernel 418. In some embodiments, the start-up module 502 creates the reserved area 410 in the RAM 402 when reserving memory space in the RAM 402.

The start-up module 502 is configured to create and/or reserve an amount of memory space in the RAM 402 such that the reserved area 410 includes a predetermined and/or fixed size and/or amount of memory space. The predetermined and/or fixed size and/or amount of memory space reserved by the start-up module 502 may include any of the sizes and/or range of sizes discussed elsewhere herein. In various embodiments, the predetermined and/or fixed size and/or amount of memory space reserved by the reservation module 504 is less than the amount or memory space used to boot the secondary kernel 418.

A load module 504 may include any suitable hardware and/or software that can load a kernel to RAM. In various embodiments, the load module 504 is configured to load a secondary kernel 418 to a reserved area 410 of RAM 402. In some embodiments, the load module 504 is configured to enable and/or facilitate (e.g., via the primary kernel 414) loading the secondary kernel 418 to the reserved area 410 of the RAM 402 as a portion of a boot process and/or algorithm for the O/S 404.

In additional or alternative embodiments, a load module 504, in loading the secondary kernel 418) can create a purgatory (e.g., purgatory 702 in FIG. 7) in the RAM 402. The purgatory 702 can include any suitable hardware and/or software that can transfer control of and/or facilitate transitioning control of an O/S 404 from a primary kernel 414 to a secondary kernel 418.

The purgatory 702 can include any suitable type of object that is known or developed in the future. In various embodiments, the purgatory 702 includes a binary object that runs between the primary kernel 414 and the secondary kernel 418. In some embodiments, the purgatory 702 includes a stand-alone object (e.g., is not linked with the primary kernel 414 or the secondary kernel 418) that can be relocated by a system call that loads a new kernel for later execution (e.g., kexec syscall).

An error detection module 506 may include any suitable hardware and/or software that can detect when the primary kernel 414 is experiencing an error (e.g., is experiencing a bug and/or a malfunction, etc.), goes offline, and/or otherwise becomes unavailable or inoperable. The error detection module 506 can utilize any suitable error detection technique that is known or developed in the future capable of detecting and/or determining that the primary kernel 414 is inoperable and/or unavailable. In various embodiments, the error detection module 506 is configured to notify (e.g., transmit a notice to) a control module 508 indicating that the primary kernel 414 is offline, inoperable, or otherwise unavailable.

A control module 508 may include any suitable hardware and/or software that can pass control of an operating system from one operating system kernel to another operating system kernel. In various embodiments, the control module 508 is configured to receive a notification and/or a notice from an error detection module 506 that the primary kernel 414 is offline, inoperable, or otherwise unavailable and pass the control of the operating system in response to the notification and/or notice.

In various embodiments, the control module 508 is configured to transfer control of and/or facilitate passing control of an O/S 404 from a primary kernel 414 to a secondary kernel 418 utilizing a purgatory 702. In some embodiments, the control module 508 passes control of the O/S 404 from the primary kernel 414 to the purgatory 702. The control module 508 is further configured to transition control of the O/S 404 from the purgatory 702 to the secondary kernel 418. In further embodiments, the control module 508 is configured to notify (e.g., transmit a notice to) a boot module 510 that the secondary kernel 418 is in control of the O/S 404.

A boot module 510 may include any suitable hardware and/or software that can boot a backup operating system kernel. In some embodiments, the boot module 510 is configured to receive the notice/notification from the control module 508 and begin booting the backup operating system kernel in response thereto.

In various embodiments, the boot module 510 is configured to boot and/or facilitate booting the secondary kernel 418 from the reserved area 410. In some embodiments, the boot module 510 is configured to boot and/or facilitate booting the secondary kernel 418 in response to control of the O/S 404 being passed to the secondary kernel 418. In additional or alternative embodiments, the boot module 510 boots and/or facilitates booting the secondary kernel 418 utilizing a boot algorithm.

In various embodiments, the boot module 510 is configured to track the progress of booting the secondary kernel 418 and/or the progress of performing a boot algorithm. The boot module 510, in some embodiments, is configured to track the progress of booting the secondary kernel 418 and boot the secondary kernel 418 until a threshold amount of the secondary kernel 418 is booted. In additional or alternative embodiments, the boot module 510 is configured to perform a boot algorithm and boot the secondary kernel 418 until a predetermined point in the boot algorithm has been performed.

The boot module 510, in various embodiments, is configured to determine and/or track how much of the memory space in the reserved area 410 has been consumed in booting the secondary kernel 418. In additional or alternative embodiments, the boot module 510 is configured to determine and/or track how much of the memory space in the reserved area 410 has been consumed in performing the boot algorithm.

In various embodiments, the boot module 510 is configured to pause booting the secondary kernel 418 and/or pause performing the boot algorithm in response to the threshold amount of the secondary kernel 418 being booted. In additional or alternative embodiments, the boot module 510 is configured to pause booting the secondary kernel 418 and/or pause performing the boot algorithm in response to performing the boot algorithm to the predetermined point. In further additional or alternative embodiments, the boot module 510 is configured to pause booting the secondary kernel 418 and/or pause performing the boot algorithm in response to a predetermined amount of the reserved area 410 being consumed and/or an amount of free memory space in the reserved area being less than or equal to a threshold amount of free memory space remaining in the reserved area 410.

The boot module 510, in various embodiments, is configured to notify and/or transmit a notification to a scavenge module 512 indicating that there is insufficient memory space in the reserved area 410 to boot the secondary kernel 418 in response to determining that completing boot of the secondary kernel 418 and/or performing a remaining portion of the boot algorithm will consume more memory than is available in the reserved area 410. In additional or alternative embodiments, the boot module 510 is configured to notify and/or transmit the notification to the scavenge module 512 in response to pausing boot of the secondary kernel 418 and/or pausing performance of the boot algorithm.

In various embodiments, the boot module 510 is configured to receive notice and/or a notification from a scavenge module 512 that sufficient memory space in the RAM 402 has been freed-up and/or is available for completing boot of the secondary kernel 418 and/or performing the remaining portion of the boot algorithm. In some embodiments, the notice and/or notification includes an indication of the location(s) (e.g., address or addresses) in the RAM 402 that are free and/or available for completing boot of the secondary kernel 418 and/or performing the remaining portion of the boot algorithm.

The boot module 510, in various embodiments, is configured to continue performing and/or complete performing boot of the secondary kernel 418 in response to receiving the notice/notification from the scavenge module 512. In additional or alternative embodiments, the boot module 510 is configured to perform the remaining portion of the boot algorithm in response to receiving the notice/notification from the scavenge module 512.

In some embodiments, the boot module 510 is configured to notify and/or transmit a begin notification to the capture module 514 indicating that the boot module 510 has initiated and/or started booting the secondary kernel 418 and/or has initiated and/or started performing a boot algorithm. In additional or alternative embodiments, the boot module 510 is configured to notify and/or transmit a completion notification to a capture module 514 indicating that the secondary kernel 418 is booted in response to the secondary kernel 418 being booted.

A scavenge module 512 may include any suitable hardware and/or software that can identify available/free memory space and/or free-up memory space for completing boot operations for the secondary kernel 418 and/or performing the remaining portion of the boot algorithm. In some embodiments, the scavenge module 512 is configured to identify available/free memory space and/or free-up the memory space for completing boot operations for the secondary kernel 418 and/or performing the remaining portion of the boot algorithm in response to receiving the begin notification. In additional or alternative embodiments, the scavenge module 512 is configured to identify available/free memory space and/or free-up the memory space for completing boot operations for the secondary kernel 418 and/or performing the remaining portion of the boot algorithm in response to receiving the completion notification.

In various embodiments, the scavenge module 512 is configured to determine that a sufficient amount of free memory space is available and/or has been freed-up to complete booting the secondary kernel 418 and/or perform the remaining portion of the boot algorithm. In some embodiments, the scavenge module 512 is configured to notify (e.g., transmit a notification to) the boot module 510 that a sufficient amount of free memory space is available and/or has been freed-up to complete booting the secondary kernel 418 and/or perform the remaining portion of the boot algorithm.

With reference to FIGS. 6A through 6D, FIGS. 6A through 6D are block diagrams of various embodiments of a scavenge module 512A, 512B, 512C, and 512D (also simply referred to herein individually, in various groups, or collectively, as scavenge module(s) 512). At least in the embodiment illustrated in FIG. 6A, a scavenge module 512A includes, among other components, a reclaim module 602A.

A reclaim module 602A may include any suitable hardware and/or software that can manage memory space in the RAM 402, reclaim memory space in the RAM 402, and assign the reclaimed memory space to the secondary kernel 418 for use in booting the secondary kernel 418. In some embodiments, the reclaim module 602A is configured to manage the memory space in the kernel space 412 of the non-reserved area 408 of RAM 402. In additional or alternative embodiments, the reclaim module 602A is configured to monitor the amount of available and/or free memory space in the kernel space 412 of the non-reserved area 408. In further embodiments, the reclaim module 602A is configured to determine whether there is sufficient available and/or free memory space in the kernel space 412 of the non-reserved area 408 for completing boot of the secondary kernel 418 and/or performing the remaining portion of the boot algorithm.

The reclaim module 602A, in various embodiments, is configured to reclaim free memory space in the kernel space 412 of the non-reserved area 408 of RAM 402 in response to receiving a notification indicating that there is insufficient available memory space in the reserved area 410 to complete booting the secondary kernel 418 and/or the boot algorithm. In some embodiments, the reclaim module 602A is configured to iterate through the kernel space 412 of the non-reserved area 408 to identify any available and/or free memory pages (e.g., memory pages that are empty and/or that are not being used) in the kernel space 412. Further, the reclaim module 602A is configured to reclaim any identified available and/or free memory pages therein.

In various embodiments, the reclaim module 602A is configured to identify and reclaim any available and/or free memory pages in the kernel space 412 until a predetermined amount of the kernel space 412 is reclaimed. The predetermined amount of reclaimed kernel space 412 may include any suitable amount and/or percentage of the total amount of memory space in the RAM 402. In various embodiments, the predetermined amount of reclaimed kernel space 412 is in the range of about 1% to about 7% of the total amount of memory space in the RAM 402, among other percentages, ranges of percentages, and/or sized ranges that are possible and contemplated herein. In some embodiments, the predetermined amount of reclaimed kernel space 412 is about 5% of the total amount of memory space in the RAM 402, among other percentages that are possible and contemplated herein.

In additional or alternative embodiments, the reclaim module 602A is configured to determine whether a sufficient amount of free memory space has been reclaimed in the kernel space 412 of the non-reserved memory area 408 of RAM 402 to complete booting the secondary kernel 418 and/or to complete the boot algorithm. In various embodiments, the reclaim module 602A is configured to notify (e.g., transmit a notification to) the boot module 510 that a sufficient amount of free memory space has been reclaimed in the kernel space 412 of the non-reserved memory area 408 of RAM 402 to complete booting the secondary kernel 418 and/or to complete the boot algorithm. In some embodiments, the notification includes an indication of the amount and the location of the free memory space in the kernel space 412 that has been reclaimed for use in booting the secondary kernel 418.

Figure 6A:
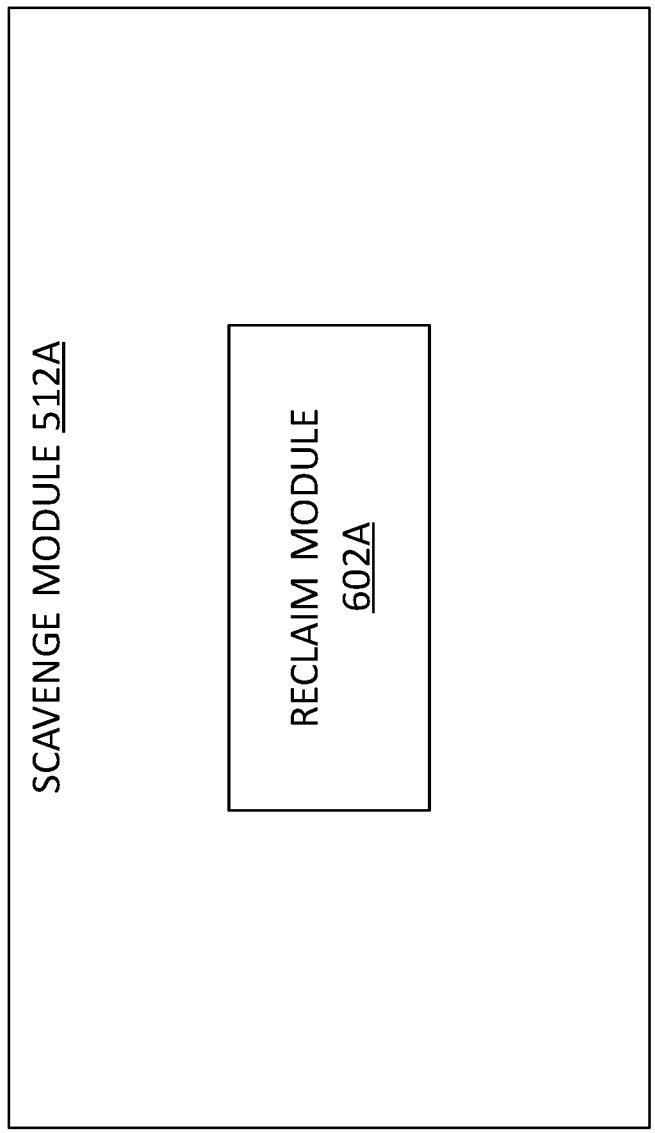

Referring to FIG. 6B, FIG. 6B is a block diagram of another embodiment of a scavenge module 512B. At least in the embodiment illustrated in FIG. 6B, a scavenge module 512B includes, among other components, a reclaim module 602B. In various embodiments, the reclaim module 602B includes the configurations and/or functionality of the various embodiments of the reclaim module 602A discussed above with reference to FIG. 6A.

In some embodiments, the reclaim module 602B is further configured to manage the memory space in the user space 416 of the non-reserved area 408 of RAM 402. In additional or alternative embodiments, the reclaim module 602B is configured to monitor the amount of available and/or free memory space in the user space 416 of the non-reserved area 408. In further embodiments, the reclaim module 602B is configured to determine whether there is sufficient available and/or free memory space in the user space 416 and the kernel space 412 of the non-reserved area 408 for completing boot of the secondary kernel 418 and/or performing the remaining portion of the boot algorithm.

The reclaim module 602B, in various embodiments, is further configured to reclaim free memory space in the user space 416 of the non-reserved area 408 of RAM 402 in response to determining that the amount of free memory space reclaimed from the kernel space 412 is insufficient to complete booting the secondary kernel 418 and/or the boot algorithm. In some embodiments, the reclaim module 602B is configured to iterate through the user space 416 of the non-reserved area 408 to identify any available and/or free user pages (e.g., user pages that are empty and/or that are not being used) in the user space 416. Further, the reclaim module 602B is configured to reclaim any identified available and/or free user pages therein.

In various embodiments, the reclaim module 602B is configured to reclaim free memory pages in the kernel space 412 and free user pages in the user space 416 until a predetermined amount of memory space is reclaimed. The predetermined amount of memory space may include any suitable amount and/or percentage of the total amount of memory space in the RAM 402. In various embodiments, the predetermined amount of memory space is in the range of about 1% to about 7% of the total amount of memory space in the RAM 402, among other percentages, ranges of percentages, and/or sized ranges that are possible and contemplated herein. In some embodiments, the predetermined amount of memory space is about 5% of the total amount of memory space in the RAM 402, among other percentages that are possible and contemplated herein.

In additional or alternative embodiments, the reclaim module 602B is configured to determine whether a sufficient amount of memory space has been reclaimed from the kernel space 412 and the user space 416 to complete booting the secondary kernel 418 and/or to complete the boot algorithm. In various embodiments, the reclaim module 602B is configured to notify (e.g., transmit a notification to) the boot module 510 that a sufficient amount of free memory space has been reclaimed in the kernel space 412 and the user space 416 to complete booting the secondary kernel 418 and/or to complete the boot algorithm. In some embodiments, the notification includes an indication of the amount and the location of the memory space in the kernel space 412 and the user space 416 that has been reclaimed for use in booting the secondary kernel 418.

Figure 6C:
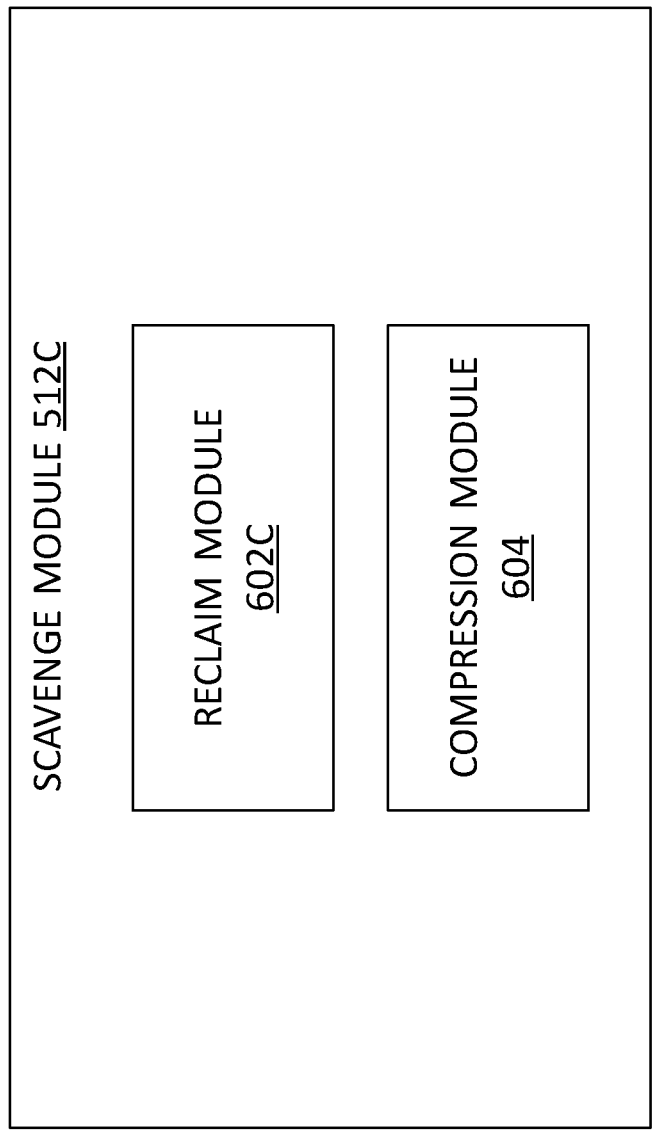

With reference to FIG. 6C, FIG. 6C is a block diagram of yet another embodiment of a scavenge module 512C. At least in the embodiment illustrated in FIG. 6C, a scavenge module 512C includes, among other components, a reclaim module 602C and a compression module 604. In various embodiments, the reclaim module 602C includes the configurations and/or functionality of the various embodiments of the reclaim module 602A discussed above with reference to FIG. 6A.

In some embodiments, the reclaim module 602C is further configured to manage the memory space in the user space 416 of the non-reserved area 408 of RAM 402. In additional or alternative embodiments, the reclaim module 602C is configured to monitor the amount of available and/or free memory space in the user space 416 of the non-reserved area 408. In further embodiments, the reclaim module 602C is configured to determine whether there is sufficient available and/or free memory space in the user space 416 and the kernel space 412 of the non-reserved area 408 for completing boot of the secondary kernel 418 and/or performing the remaining portion of the boot algorithm.

The reclaim module 602C, in various embodiments, is further configured to notify (e.g., transmit a notification and/or command to) the compression module 604 to free-up memory space in the user space 416 in response to determining that there is insufficient available and/or free memory space in the user space 416 and the kernel space 412 of the non-reserved area 408 for completing boot of the secondary kernel 418 and/or performing the remaining portion of the boot algorithm. Further, the reclaim module 602C is configured to receive a notice or notification from the compression module 604 that memory space (e.g., user pages) in the user space 416 has been freed-up (e.g., via compressing data in the user space 416). In some embodiments, the reclaim module 602C is configured to reclaim the memory space and/or user pages in the user space 416 that has been freed-up by the compression module 604 (e.g., via a compression algorithm and/or by compressing data in the memory space and/or user pages in the user space 416) in response to receiving the notice from the compression module 604.

In various embodiments, the reclaim module 602C is configured to reclaim free memory pages in the kernel space 412 and/or memory space (e.g., user pages) in the user space 416 that has been freed-up by the compression module 604 until a predetermined amount of memory space is reclaimed. The predetermined amount of memory space may include any suitable amount and/or percentage of the total amount of memory space in the RAM 402. In various embodiments, the predetermined amount of memory space is in the range of about 1% to about 7% of the total amount of memory space in the RAM 402, among other percentages, ranges of percentages, and/or sized ranges that are possible and contemplated herein. In some embodiments, the predetermined amount of memory space is about 5% of the total amount of memory space in the RAM 402, among other percentages that are possible and contemplated herein.

In additional or alternative embodiments, the reclaim module 602C is configured to determine whether a sufficient amount of memory space has been reclaimed from the kernel space 412 and the user space 416 to complete booting the secondary kernel 418 and/or to complete the boot algorithm. In various embodiments, the reclaim module 602C is configured to notify (e.g., transmit a notification to) the boot module 510 that a sufficient amount of free memory space has been reclaimed in the kernel space 412 and the user space 416 to complete booting the secondary kernel 418 and/or to complete the boot algorithm. In some embodiments, the notification includes an indication of the amount and the location of the memory space in the kernel space 412 and the user space 416 that has been reclaimed for use in booting the secondary kernel 418.

A compression module 604 may include any suitable hardware and/or software that can compress data and/or reduce the number of bits used to represent data in the user space 416 of the non-reserved area 408 in RAM 402. In some embodiments, the compression module 604 is configured to receive a notice (and/or a command) from the reclaim module 602C to compress data in the user space 416. The notice and/or command can include instructions to compress all or a portion of the data in the user space 416.

The compression module 604 may compress the data in the user space 416 using any suitable compression technique and/or compression algorithm that can compress data and/or reduce the number of bits used to represent data. As such, the compression module 604 can compress the data in the user space 416 using any compression technique and/or compression algorithm that is known or developed in the future. Further, the compression technique and/or compression algorithm can compress the data in the user space 416 at any suitable compression ratio that is known or developed in the future.

In some embodiments, the compression module 604 is configured to iterate through the user space 416 and perform an in-memory compression technique to reduce the size of the data stored therein. That is, reducing the size of the data stored in the user space 416, via compressing the data, frees-up and/or makes available additional memory space (e.g., frees-up user pages) in the user space 416.

In some embodiments, the compression module 604 is configured to compress all of the data in the user space 416. Compressing all or part of the data in the user space 416 frees-up memory space in the user space 416. In additional or alternative embodiments, the compression module 604 is configured to compress data in the user space 416 until a predetermined amount of the user space 416 is made available and/or freed-up.

The predetermined amount of available user space 416 may include any suitable amount and/or percentage of the total amount of memory space in the RAM 402. In various embodiments, the predetermined amount of available user space 416 is in the range of about 1% to about 7% of the total amount of memory space in the RAM 402, among other percentages, ranges of percentages, and/or sized ranges that are possible and contemplated herein. In some embodiments, the predetermined amount of available user space 416 is about 5% of the total amount of memory space in the RAM 402, among other percentages that are possible and contemplated herein.

In other embodiments, the compression module 604 is configured to compress a portion of the data in the user space 416. In some embodiments, the compression module 604 compresses a portion of the data in the user space 416 so that the amount of user space 416 made available and/or freed-up by compressing data in the user space 416, when combined with an amount of kernel space 412 that has been reclaimed (e.g., via a reclaim module 602), is greater than or equal to a predetermined amount of memory space in the RAM 402, which amount of memory space is used to boot the secondary kernel 418. Here, a notice (and/or command) received by the compression module 604 can include the amount of the user space 416 to be compressed by the compression technique/algorithm so that the amount of user space 416 that is made available and/or freed-up via data compression supplements an amount of kernel space 412 reclaimed by the reclaim module 602C to obtain a predetermined amount of available memory space in the RAM 402.

The compression module 604 is configured to notify (e.g., transmit a notification to) the reclaim module 602C that at least some user space 416 has been freed-up via compression. In various embodiments, the notice/notification includes an indication of the amount of memory space in the user space 416 that has been freed-up. In some embodiments, the notice/notification includes an indication of whether the predetermined amount of memory space in the RAM 402 that includes the user space 416 freed-up via compression or the user space 416 freed-up via compression in combination with the reclaimed kernel space 414 has been obtained.

Referring to FIG. 6D, FIG. 6D is a block diagram of still another embodiment of a scavenge module 512D. At least in the embodiment illustrated in FIG. 6D, a scavenge module 512D includes, among other components, a reclaim module 602D and a deduplication module 606. In various embodiments, the reclaim module 602D includes the configurations and/or functionality of the various embodiments of the reclaim module 602A discussed above with reference to FIG. 6A.

In some embodiments, the reclaim module 602D is further configured to manage the memory space in the user space 416 of the non-reserved area 408 of RAM 402. In additional or alternative embodiments, the reclaim module 602D is configured to monitor the amount of available and/or free memory space in the user space 416 of the non-reserved area 408. In further embodiments, the reclaim module 602D is configured to determine whether there is sufficient available and/or free memory space in the user space 416 and the kernel space 412 of the non-reserved area 408 for completing boot of the secondary kernel 418 and/or performing the remaining portion of the boot algorithm.

The reclaim module 602D, in various embodiments, is further configured to notify (e.g., transmit a notification and/or command to) the deduplication module 606 to free-up memory space in the user space 416 in response to determining that there is insufficient available and/or free memory space in the user space 416 and the kernel space 412 of the non-reserved area 408 for completing boot of the secondary kernel 418 and/or performing the remaining portion of the boot algorithm. Further, the reclaim module 602D is configured to receive a notice or notification from the deduplication module 606 that memory space (e.g., user pages) in the user space 416 has been freed-up (e.g., via deduplicating data in the user space 416). In some embodiments, the reclaim module 602D is configured to reclaim the memory space and/or user pages in the user space 416 that has been freed-up by the deduplication module 606 (e.g., via a deduplication algorithm and/or by deduplicating data in the memory space and/or user pages in the user space 416) in response to receiving the notice from the deduplication module 606.

In various embodiments, the reclaim module 602D is configured to reclaim free memory pages in the kernel space 412 and/or memory space (e.g., user pages) in the user space 416 that has been freed-up by the deduplication module 606 until a predetermined amount of memory space is reclaimed. The predetermined amount of memory space may include any suitable amount and/or percentage of the total amount of memory space in the RAM 402. In various embodiments, the predetermined amount of memory space is in the range of about 1% to about 7% of the total amount of memory space in the RAM 402, among other percentages, ranges of percentages, and/or sized ranges that are possible and contemplated herein. In some embodiments, the predetermined amount of memory space is about 5% of the total amount of memory space in the RAM 402, among other percentages that are possible and contemplated herein.

In additional or alternative embodiments, the reclaim module 602D is configured to determine whether a sufficient amount of memory space has been reclaimed from the kernel space 412 and the user space 416 to complete booting the secondary kernel 418 and/or to complete the boot algorithm. In various embodiments, the reclaim module 602D is configured to notify (e.g., transmit a notification to) the boot module 510 that a sufficient amount of free memory space has been reclaimed in the kernel space 412 and the user space 416 to complete booting the secondary kernel 418 and/or to complete the boot algorithm. In some embodiments, the notification includes an indication of the amount and the location of the memory space in the kernel space 412 and the user space 416 that has been reclaimed for use in booting the secondary kernel 418.

A deduplication module 606 may include any suitable hardware and/or software that can deduplicate data and/or reduce the quantity of copies of data in the user space 416 of the non-reserved area 408 of RAM 402. In some embodiments, the deduplication module 606 is configured to receive a notice (and/or a command) from the reclaim module 602D to reduce the number of copies of data in the user space 416. The notice and/or command can include instructions to deduplicate all or a portion of the data in the user space 416.

The deduplication module 606 can deduplicate the data in the user space 416 using any suitable deduplication technique and/or deduplication algorithm that can reduce the number of data copies. As such, the deduplication module 606 can deduplicate the data using any deduplication technique and/or deduplication algorithm that is known or developed in the future.

Further, the deduplication technique and/or deduplication algorithm can deduplicate the data in the user space 416 so that any suitable quantity of data copies remains in the user space 416. That is, the deduplication technique and/or deduplication algorithm can deduplicate the data in the user space 416 so that only the original data remains or so that the original data and one or more copies of the original data remains stored in the user space 416.

In various embodiments, the deduplication module 606 is configured to deduplicate data in the user space 416 in response to receiving the notice (and/or command) from the reclaim module 602D. In some embodiments, the deduplication module 606 is configured to iterate through the user space 416 and perform an in-memory deduplication technique to delete one or more copies of the same data to reduce the amount of data stored therein. That is, reducing the number of data copies reduces the amount of the data stored in the user space 416, which frees-up and/or makes available additional memory space (e.g., frees-up user pages) in the user space 416.

In some embodiments, the deduplication module 606 is configured to deduplicate all of the data in the user space 416. Deduplicating all or part of the data in the user space 416 frees-up memory space in the user space 416. In additional or alternative embodiments, the deduplication module 606 is configured to deduplicate data in the user space 416 until a predetermined amount of the user space 416 is made available and/or freed-up.

The predetermined amount of available user space 416 may include any suitable amount and/or percentage of the total amount of memory space in the RAM 402. In various embodiments, the predetermined amount of available user space 416 is in the range of about 1% to about 7% of the total amount of memory space in the RAM 402, among other percentages, ranges of percentages, and/or sized ranges that are possible and contemplated herein. In some embodiments, the predetermined amount of available user space 416 is about 5% of the total amount of memory space in the RAM 402, among other percentages that are possible and contemplated herein.

In other embodiments, the deduplication module 606 is configured to deduplicate a portion of the data in the user space 416. In some embodiments, the deduplication module 606 deduplicates a portion of the data in the user space 416 so that the amount of user space 416 made available and/or freed-up by deleting copies of data in the user space 416, when combined with an amount of kernel space 416 that has been reclaimed (e.g., free memory pages reclaimed via the reclaim module 602D), is greater than or equal to a predetermined amount of memory space in the RAM 402, which memory space is used to boot the secondary kernel 418. Here, the notice (and/or command) received by the deduplication module 606 can include the amount of data, the type of data, the owner, and/or the importance level, etc., among other metrics/characteristics that are possible and contemplated herein, of the data in the user space 416 to be deduplicated by the deduplication technique/algorithm so that the amount of user space 416 that is made available and/or freed-up via deduplication supplements an amount of kernel space 412 reclaimed by the reclaim module 602D to obtain a predetermined amount of available memory space in the RAM 402.

The predetermined amount of available user space 416 and kernel space 412 may include any suitable amount and/or percentage of the total amount of memory space in the RAM 402. In various embodiments, the predetermined amount of available user space 416 and kernel space 412 is in the range of about 1% to about 7% of the total amount of memory space in the RAM 402, among other percentages, ranges of percentages, and/or sized ranges that are possible and contemplated herein. In some embodiments, the predetermined amount of available user space 416 and kernel space 412 is about 5% of the total amount of memory space in the RAM 402, among other percentages that are possible and contemplated herein.

The deduplication module 606 is configured to notify (e.g., transmit a notification to) the reclaim module 602D that at least some data in the user space 416 has been freed-up via deduplication. In various embodiments, the notice/notification includes an indication of the amount of memory space in the user space 416 that has been freed-up. In some embodiments, the notice/notification includes an indication of whether the predetermined amount of memory space in the RAM 402 that includes the user space 416 freed-up via deduplication or the user space 416 freed-up via deduplication in combination with the reclaimed kernel space 412 has been obtained.

With reference again to FIG. 5A, a capture module 514 may include any suitable hardware and/or software that can perform a capture process to capture a dump for the primary kernel 414 (e.g., captures resources that were utilized to boot the primary kernel 414). In various embodiments, the capture process maps memory pages (e.g., one page at a time) to create a dump file (e.g., a pseudofile generated on the fly) that maps all of the memory regions of the primary kernel 414. Further, the capture process exports the dump file so that the dump file can be filtered to create a kdump file. Further, the capture process stores and filters the kdump file to create a kdump for rebooting to the primary kernel 414.

A reboot module 516 may include any suitable hardware and/or software that can reboot and/or facilitate (e.g., via the secondary kernel 418) rebooting the primary kernel 414. The reboot module 516 can reboot and/or facilitate rebooting the primary kernel 414 utilizing any suitable reboot process and/or algorithm that is known or developed in the future. In various embodiments, the reboot module 516 utilizes the kdump created by the capture process to reboot and/or facilitate rebooting the primary kernel.

Referring to FIG. 5B, FIG. 5B is a block diagram of another embodiment of a processor 406B that can be included in and/or as a portion of a computing resource 400. At least in the illustrated embodiment, a processor 406B includes, among other components, a boot module 510 and a scavenge module 512 similar to the processor 406A discussed above with reference to FIG. 5A.

Figure 7:
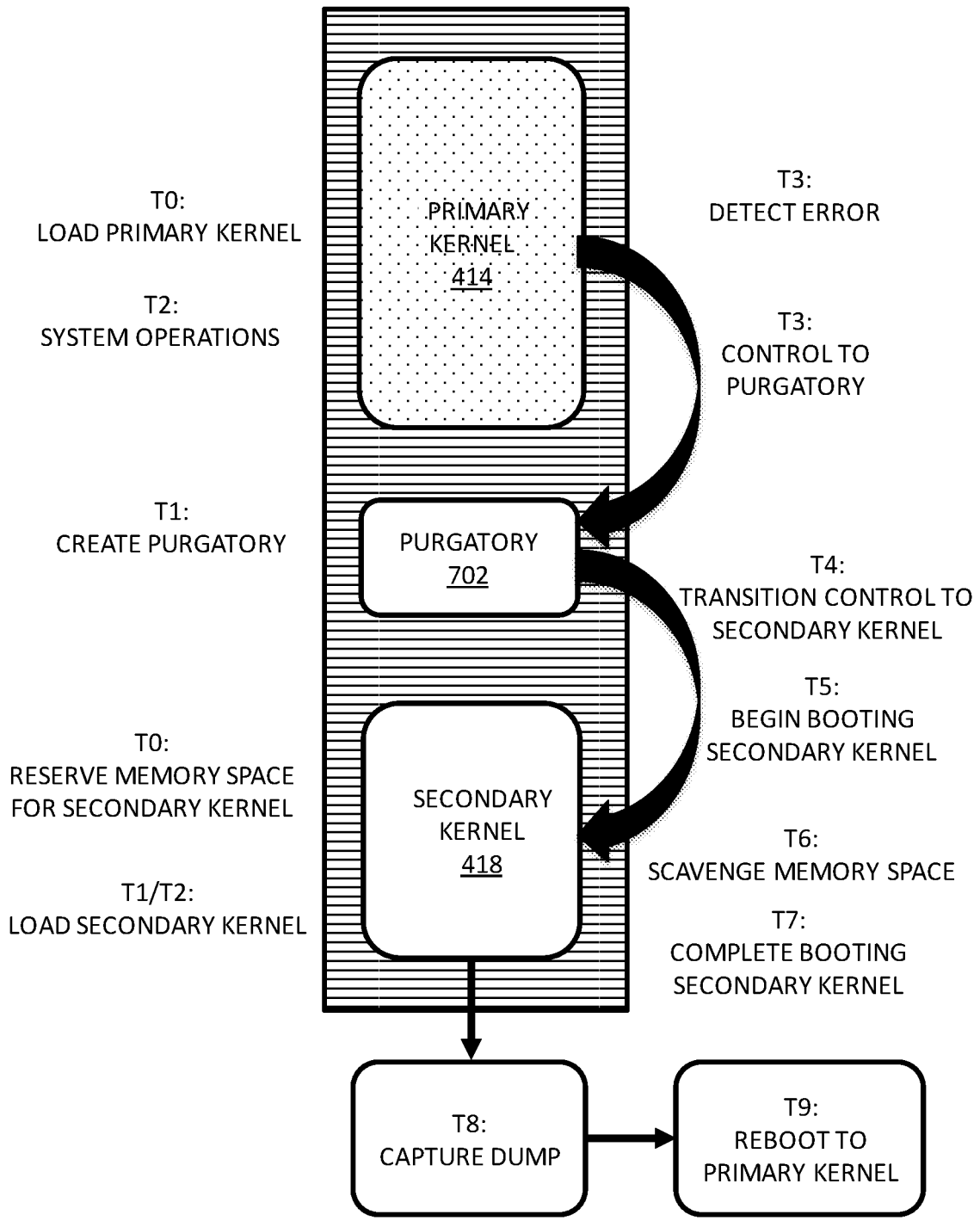
FIG. 7 is a timing diagram illustrating one example of operations for the processor of FIG. 5A.

Referring to FIG. 7, FIG. 7 is a timing diagram illustrating one example of operations for a processor 406. At least in the illustrated example, a processor 406, at time T0, loads the primary kernel 414 to RAM 402 and reserves memory space (e.g., reserved area 410) in RAM 402 for the secondary kernel 418.

At time T1, the primary kernel 414 creates a purgatory 702. In some embodiments, the primary kernel 414 further loads the secondary kernel 418 to the reserved area 410 at time T1. Further, at time T2, the primary kernel 414 can the commence system operations (e.g., a regular workload). In some embodiments, the primary kernel 414 further loads the secondary kernel 418 to the reserved area 410 at time T2. That is, in various embodiments, the primary kernel 414 can load the secondary kernel 418 to the reserved area 410 at any time prior to the primary kernel 414 experiencing an error and/or crashing (e.g., at time T3).

The processor 406, at time T3, can detect and/or determine that the primary kernel 414 is experiencing an error (e.g., crashes) and pass control of the O/S 404 to the purgatory 702. At time T4, the purgatory 702 transitions control of the O/S 404 to the secondary kernel 418 and the processor 406 begins booting the secondary kernel 418 at time T5.

At time T6, memory space in the kernel space 412 and/or in the user space 416 is scavenged so that the boot process for the secondary kernel 418 can be completed at time T7. The processor 406, at time T8, captures a dump for the primary kernel 414 and is rebooted to the primary kernel 414 at time T9.

Figure 8:
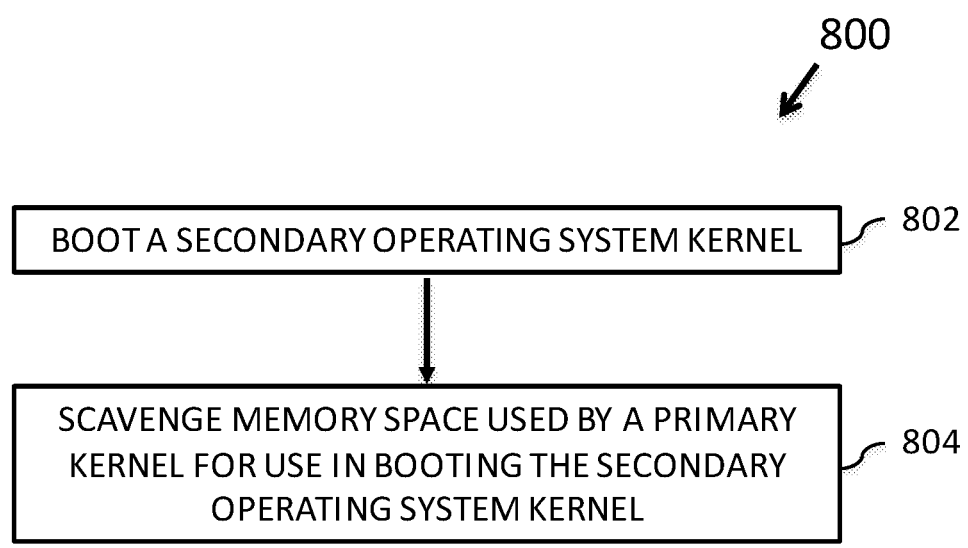
FIG. 8 is a schematic flow chart diagram illustrating one embodiment of a method for booting a secondary operating system kernel with reclaimed primary kernel memory.

With reference to FIG. 8, FIG. 8 is a schematic flow chart diagram illustrating one embodiment of a method 800 for booting a secondary operating system kernel with reclaimed primary kernel memory. At least in the illustrated embodiment, the method 800 can begin by a processor 406A or 406B (also simply referred to herein individually, in various groups, or collectively, as processor(s) 406) booting a secondary kernel 418 to a reserved area 410 (block 802).

The processor 406 can then scavenge memory space 408 used by a primary kernel 414 (e.g., kernel space 412 and/or in the user space 416) for use in booting the secondary kernel 418 (block 804). The memory space 408 may be scavenged utilizing any of the techniques and/or processes that can reclaim and/or free-up memory space in the kernel space 412 and/or in the user space 416 discussed elsewhere herein.

Figure 9:
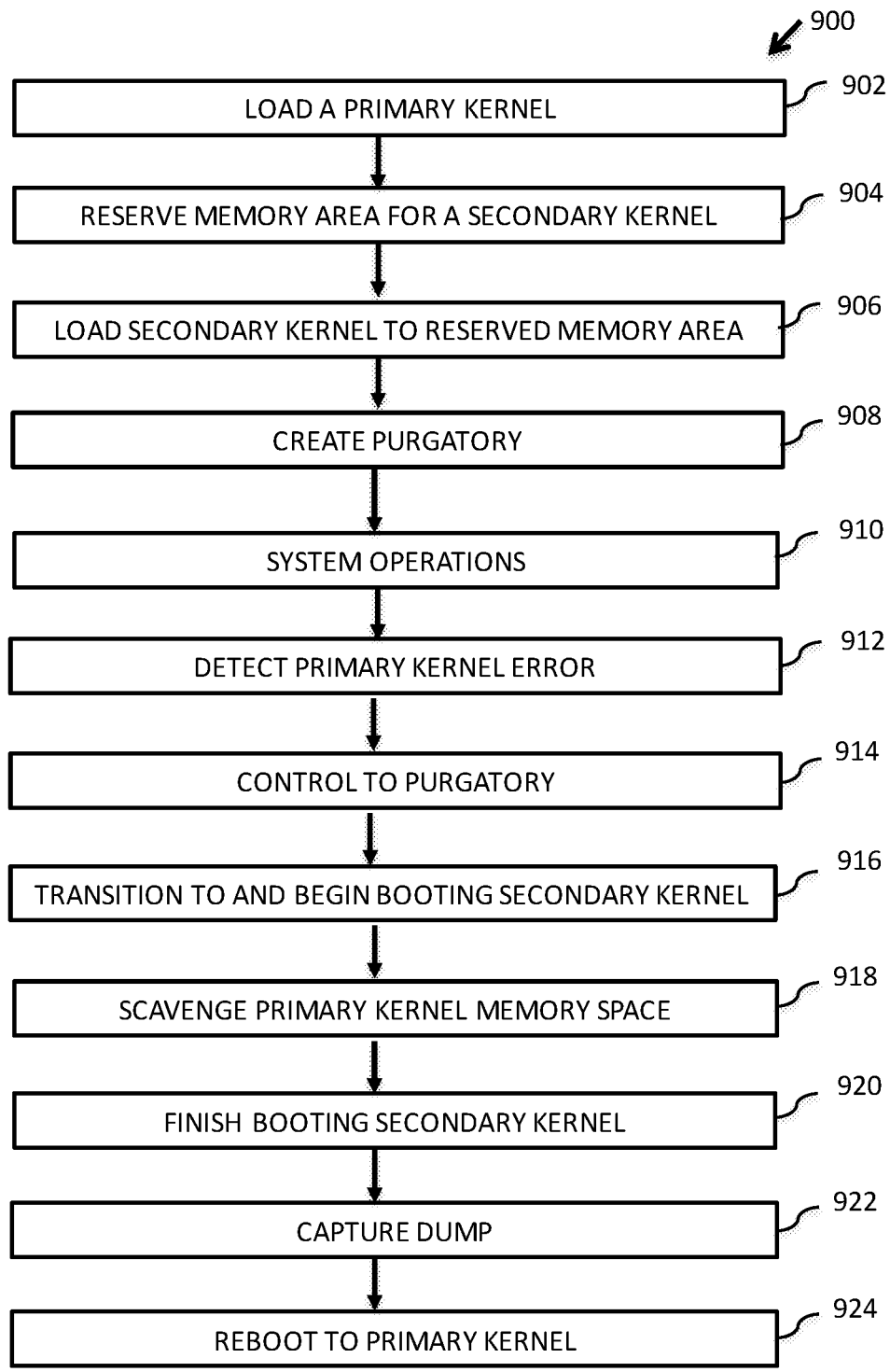
FIG. 9 is a schematic flow chart diagram illustrating another embodiment of a method for booting a secondary operating system kernel with reclaimed primary kernel memory.

Referring to FIG. 9, FIG. 9 is a schematic flow chart diagram illustrating another embodiment of a method 900 for booting a secondary operating system kernel with reclaimed primary kernel memory. At least in the illustrated embodiment, the method 900 begins by a processor 406 loading the primary kernel 414 to RAM 402 (block 902).

The processor 406 can reserve memory space (e.g., reserved area 410) in RAM 402 for the secondary kernel 418 (block 904) and load the secondary kernel 418 to the reserved area 410 (block 906). A purgatory 702 is created (block 908) and system operations are commenced (block 910).

The processor 406 detects and/or determines that the primary kernel 414 is experiencing an error (block 912) and passes control of the O/S 404 to the purgatory 702 (block 914). The purgatory 702 transitions control of the O/S 404 to the secondary kernel 418 and the processor 406 begins booting the secondary kernel 418 (block 916).

Memory space in the kernel space 412 and/or in the user space 416 is scavenged (block 918) and the boot process for the secondary kernel 418 is completed (block 920). The processor 406 captures a dump for the primary kernel 414 (block 922) and the dump is rebooted to the primary kernel 414 (block 924).

Figure 10:
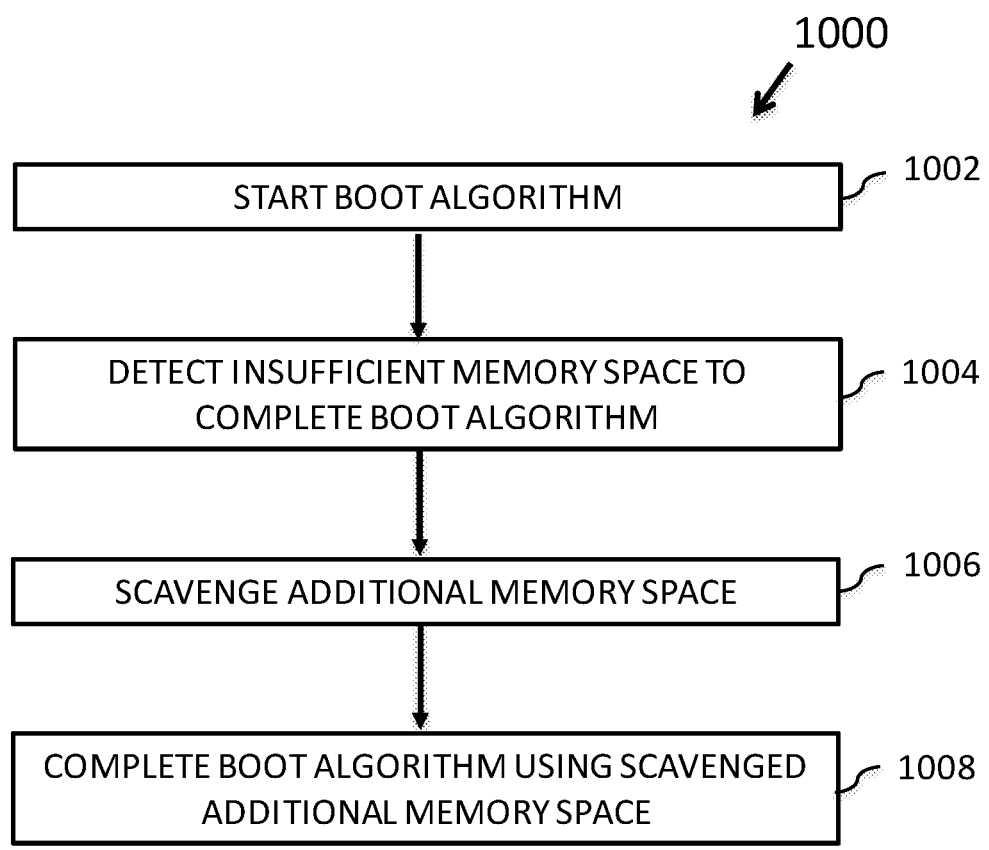
FIG. 10 is a schematic flow chart diagram illustrating yet another embodiment of a method for booting a secondary operating system kernel with reclaimed primary kernel memory.

With reference to FIG. 10, FIG. 10 is a schematic flow chart diagram illustrating yet embodiment of a method 1000 for booting a secondary operating system kernel with reclaimed primary kernel memory. At least in the illustrated embodiment, the method 1000 begins by a processor 406 starting to perform a boot algorithm on a secondary kernel 918 (block 1002).

The processor 406 detects that there is an insufficient amount of memory space for completing boot of the secondary kernel 418 (block 1004). The processor 406 can then scavenge memory space 408 used by a primary kernel 414 (e.g., kernel space 412 and/or in the user space 416) for use in booting the secondary kernel 418 (block 1006). The memory space 408 may be scavenged utilizing any of the techniques and/or processes that can reclaim and/or free-up memory space in the kernel space 412 and/or in the user space 416 discussed elsewhere herein. The processor 406 can then complete booting the secondary kernel 418 (block 1008).

Figure 11:
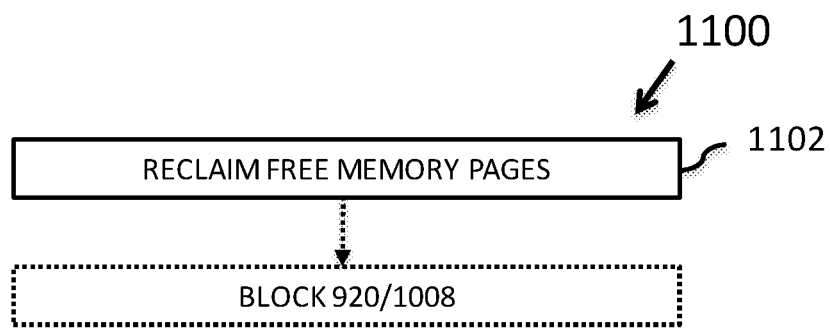
FIG. 11 is a schematic flow chart diagram illustrating one embodiment of a method for reclaiming primary kernel memory.

Referring to FIG. 11, FIG. 11 is a schematic flow chart diagram illustrating one embodiment of a method 1100 for reclaiming primary kernel memory (e.g., kernel space 412). At least in the illustrated embodiment, the method 1100 begins by a processor 406 reclaiming a set of free memory pages in a kernel space 414 of the RAM 402 (block 1102). The free memory page(s) may be reclaimed in accordance with the various embodiments discussed elsewhere herein. In accordance with various embodiments, a boot process and/or boot algorithm for a secondary kernel 418 can be performed and/or completed using the reclaimed set of free memory pages (see block 902 of method 900 and block 1008 of method 1000).

Figure 12:
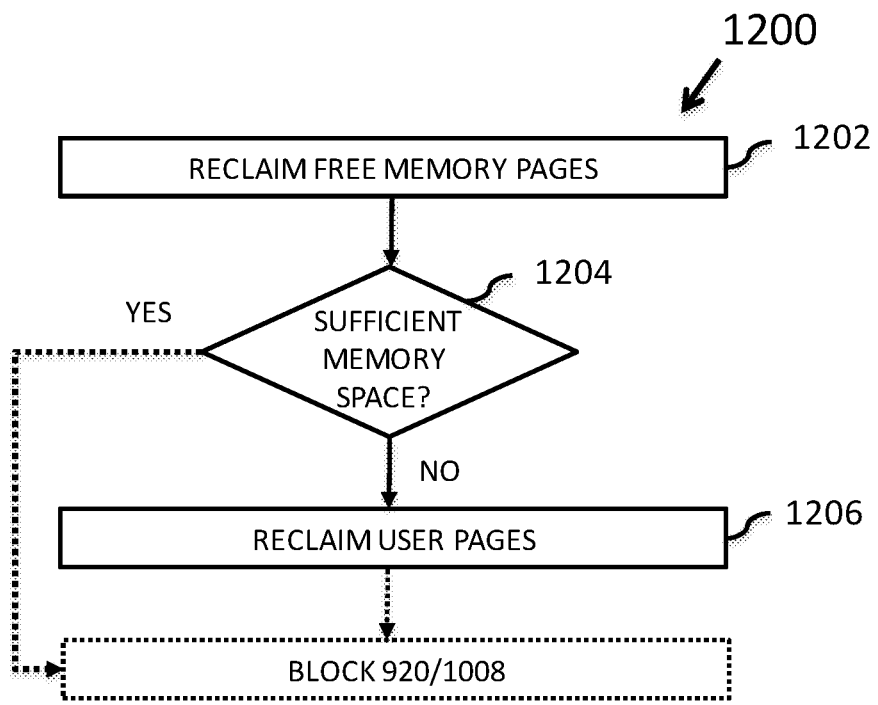
FIG. 12 is a schematic flow chart diagram illustrating another embodiment of a method for reclaiming primary kernel memory.

With reference to FIG. 12, FIG. 12 is a schematic flow chart diagram illustrating another embodiment of a method 1200 for reclaiming primary kernel memory (e.g., kernel space 412 and/or use space 416). At least in the illustrated embodiment, the method 1200 begins by a processor 406 reclaiming a set of free memory pages in a kernel space 414 of the RAM 402 (block 1202). The free memory page(s) may be reclaimed in accordance with the various embodiments discussed elsewhere herein.

The processor 406 can then determine whether a sufficient amount of free memory space for completing a boot process and/or algorithm for a secondary kernel 418 has been reclaimed from the kernel space 414 (block 1204). In response to determining that an insufficient amount of free memory space for completing the boot process and/or algorithm has been reclaimed from the kernel space 414 (e.g., a "NO" in block 1204), the processor 406 reclaims a set of user pages in a user space 416 of the RAM 402 (block 1206). The user page(s) may be reclaimed in accordance with the various embodiments discussed elsewhere herein.

In accordance with various embodiments, a boot process and/or boot algorithm for a secondary kernel 418 can be performed and/or completed using the reclaimed set of free memory pages and/or user pages (see block 902 of method 900 and block 1008 of method 1000). In addition, in response to determining that a sufficient amount of memory space for completing the boot process and/or algorithm has been reclaimed from the kernel space 414 (e.g., a "YES" in block 1204), the boot process and/or algorithm can be completed using the reclaimed set of free memory pages (see block 902 of method 900 and block 1008 of method 1000).

Figure 13A:
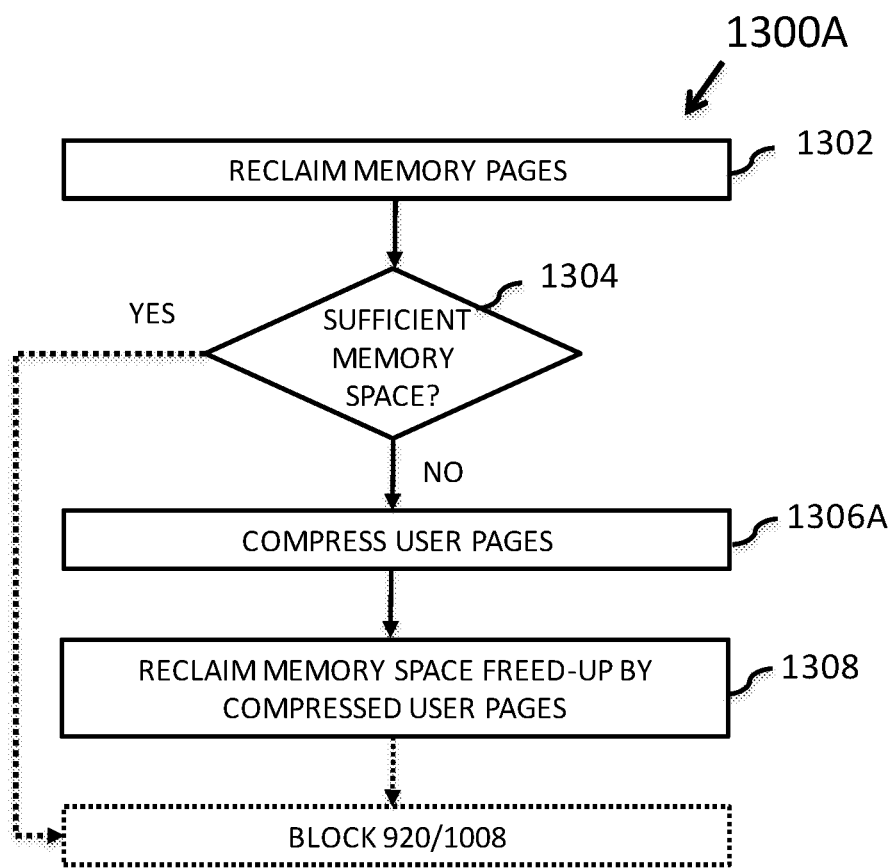
FIGS. 13A and 13B are schematic flow chart diagrams illustrating various embodiments of a method for reclaiming primary kernel memory.

Referring to FIG. 13A, FIG. 13A is a schematic flow chart diagram illustrating yet another embodiment of a method 1300A for reclaiming primary kernel memory (e.g., kernel space 412 and/or use space 416). At least in the illustrated embodiment, the method 1300A begins by a processor 406 reclaiming a set of free memory pages in a kernel space 414 of the RAM 402 (block 1302). The free memory page(s) may be reclaimed in accordance with the various embodiments discussed elsewhere herein.

The processor 406 can then determine whether a sufficient amount of memory space for completing a boot process and/or algorithm has been reclaimed from the kernel space 414 (block 1304). In response to determining that an insufficient amount of memory space for completing the boot process and/or algorithm has been reclaimed from the kernel space 414 (e.g., a "NO" in block 1304), the processor 406 compresses a set of user pages in a user space 416 of the RAM 402 to free-up memory space in the user space 416 (block 1306A). The processor 406 may perform any suitable compression technique to compress the set of user pages in the user space 416, as discussed elsewhere herein.

In accordance with various embodiments, a boot process and/or boot algorithm for a secondary kernel 418 can be performed and/or completed using the reclaimed set of free memory pages and/or freed-up user space 416 (see block 902 of method 900 and block 1008 of method 1000). In addition, in response to determining that a sufficient amount of memory space for completing the boot process and/or algorithm has been reclaimed from the kernel space 414 (e.g., a "YES" in block 1304), the boot process and/or algorithm can be completed using the reclaimed set of free memory pages (see block 902 of method 900 and block 1008 of method 1000).

Figure 13B:
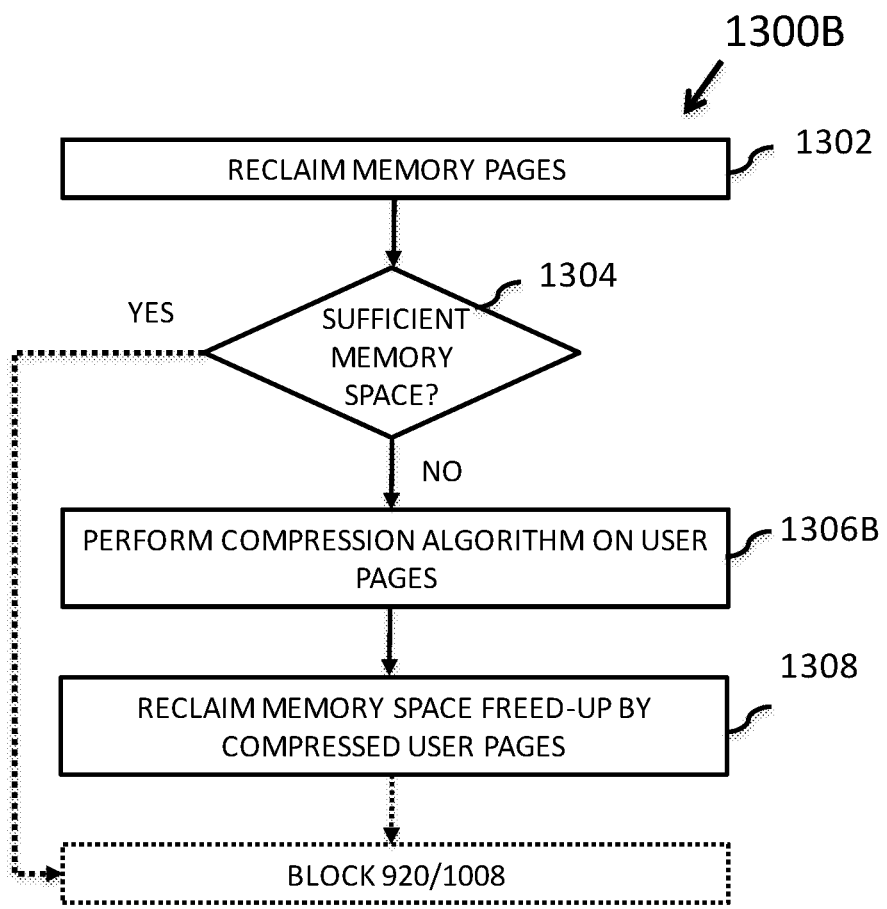

With reference to FIG. 13B, FIG. 13B is a schematic flow chart diagram illustrating still another embodiment of a method 1300B for reclaiming primary kernel memory (e.g., kernel space 412 and/or use space 416). At least in the illustrated embodiment, the method 1300B begins by a processor 406 reclaiming a set of free memory pages in a kernel space 414 of the RAM 402 (block 1302). The free memory page(s) may be reclaimed in accordance with the various embodiments discussed elsewhere herein.

The processor 406 can then determine whether a sufficient amount of memory space for completing a boot process and/or algorithm has been reclaimed from the kernel space 414 (block 1304). In response to determining that an insufficient amount of memory space for completing the boot process and/or algorithm has been reclaimed from the kernel space 414 (e.g., a "NO" in block 1304), the processor 406 performs a compression algorithm on a set of user pages in a user space 416 of the RAM 402 to free-up memory space in the user space 416 (block 1306B). The processor 406 may perform any suitable compression algorithm to compress the set of user pages in the user space 416, as discussed elsewhere herein.

In accordance with various embodiments, a boot process and/or boot algorithm for a secondary kernel 418 can be performed and/or completed using the reclaimed set of free memory pages and/or freed-up user space 416 (see block 902 of method 900 and block 1008 of method 1000). In addition, in response to determining that a sufficient amount of memory space for completing the boot process and/or algorithm has been reclaimed from the kernel space 414 (e.g., a "YES" in block 1304), the boot process and/or algorithm can be completed using the reclaimed set of free memory pages (see block 902 of method 900 and block 1008 of method 1000).

Figure 14A:
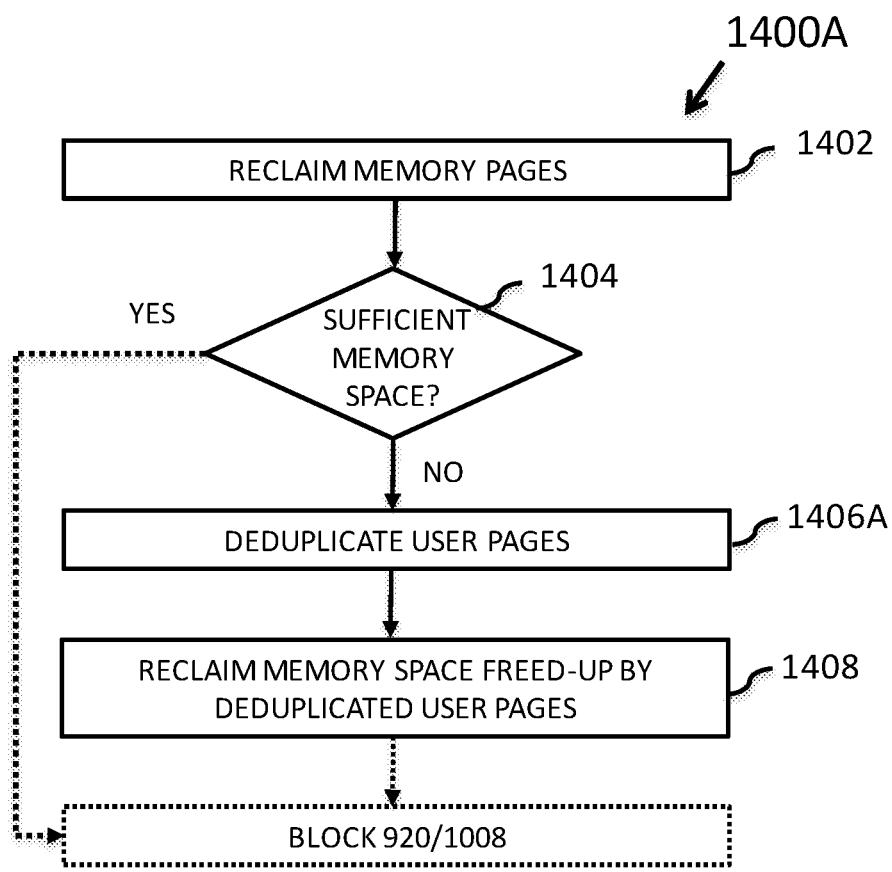
FIGS. 14A and 14B are schematic flow chart diagrams illustrating various other embodiments of a method for reclaiming primary kernel memory.

Referring to FIG. 14A, FIG. 14A is a schematic flow chart diagram illustrating another embodiment of a method 1400A for reclaiming primary kernel memory (e.g., kernel space 412 and/or use space 416). At least in the illustrated embodiment, the method 1400A begins by a processor 406 reclaiming a set of free memory pages in a kernel space 414 of the RAM 402 (block 1402). The free memory page(s) may be reclaimed in accordance with the various embodiments discussed elsewhere herein.

The processor 406 can then determine whether a sufficient amount of memory space for completing a boot process and/or algorithm has been reclaimed from the kernel space 414 (block 1404). In response to determining that an insufficient amount of memory space for completing the boot process and/or algorithm has been reclaimed from the kernel space 414 (e.g., a "NO" in block 1404), the processor 406 deduplicates a set of user pages in a user space 416 of the RAM 402 to free-up memory space in the user space 416 (block 1406A). The processor 406 may perform any suitable deduplication technique that can delete one or more copies of the same data in the user space 416, as discussed elsewhere herein.

In accordance with various embodiments, a boot process and/or boot algorithm for a secondary kernel 418 can be performed and/or completed using the reclaimed set of free memory pages and/or freed-up user space 416 (see block 902 of method 900 and block 1008 of method 1000). In addition, in response to determining that a sufficient amount of memory space for completing the boot process and/or algorithm has been reclaimed from the kernel space 414 (e.g., a "YES" in block 1404), the boot process and/or algorithm can be completed using the reclaimed set of free memory pages (see block 902 of method 900 and block 1008 of method 1000).

Figure 14B:
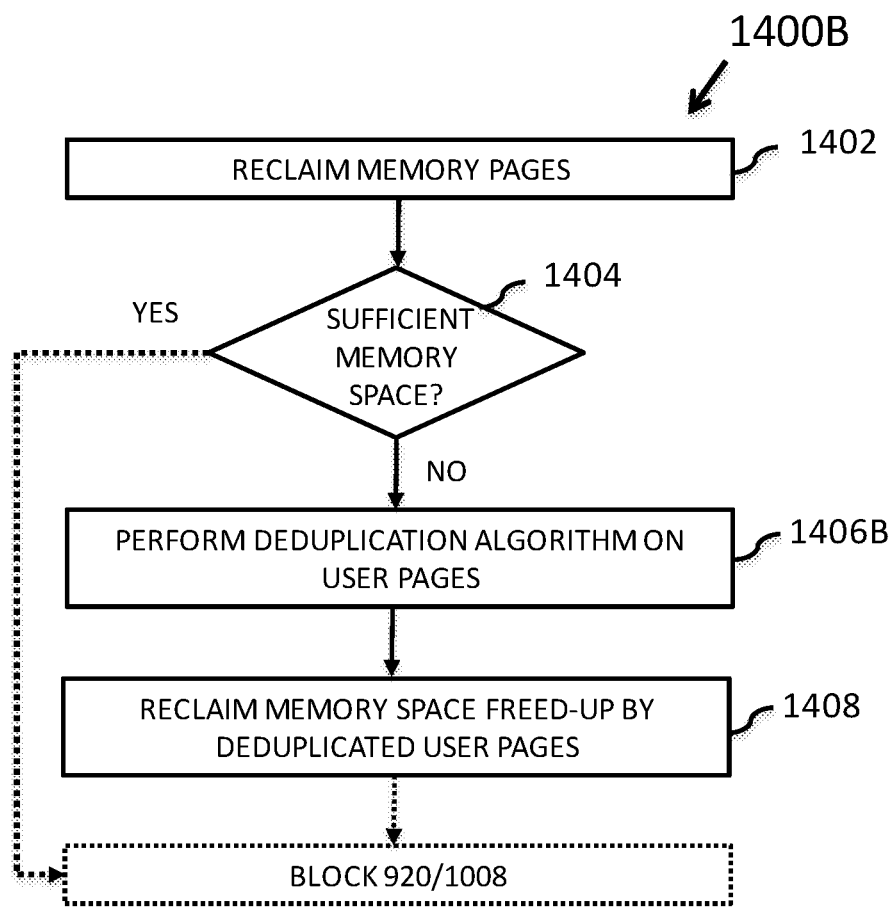

With reference to FIG. 14B, FIG. 14B is a schematic flow chart diagram illustrating still another embodiment of a method 1400B for reclaiming primary kernel memory (e.g., kernel space 412 and/or use space 416). At least in the illustrated embodiment, the method 1400B begins by a processor 406 reclaiming a set of free memory pages in a kernel space 414 of the RAM 402 (block 1402). The free memory page(s) may be reclaimed in accordance with the various embodiments discussed elsewhere herein.

The processor 406 can then determine whether a sufficient amount of memory space for completing a boot process and/or algorithm has been reclaimed from the kernel space 414 (block 1404). In response to determining that an insufficient amount of memory space for completing the boot process and/or algorithm has been reclaimed from the kernel space 414 (e.g., a "NO" in block 1404), the processor 406 performs a deduplication algorithm on a set of user pages in a user space 416 of the RAM 402 to free-up memory space in the user space 416 (block 1406B). The processor 406 may perform any suitable deduplication algorithm that can delete one or more copies of the same data in the user space 416, as discussed elsewhere herein.

In accordance with various embodiments, a boot process and/or boot algorithm for a secondary kernel 418 can be performed and/or completed using the reclaimed set of free memory pages and/or freed-up user space 416 (see block 902 of method 900 and block 1008 of method 1000). In addition, in response to determining that a sufficient amount of memory space for completing the boot process and/or algorithm has been reclaimed from the kernel space 414 (e.g., a "YES" in block 1404), the boot process and/or algorithm can be completed using the reclaimed set of free memory pages (see block 902 of method 900 and block 1008 of method 1000).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising: a boot module that boots, via a boot algorithm, a secondary kernel for an operating system (O/S) in response to a primary kernel for the O/S going offline, wherein the secondary kernel is configured to be loaded to a reserved memory area; and a scavenge module that reclaims memory space from the primary kernel for use in booting the secondary kernel in response to a determination that the reserved memory area includes insufficient memory space for completing the boot algorithm, wherein: the scavenge module comprises a reclaim module that, in reclaiming the amount of memory space from the primary kernel, reclaims an amount of free memory pages from the primary kernel, the boot module is further configured to: perform a portion of the boot algorithm, notify the scavenge module that the reserved memory area includes insufficient memory space for performing a remaining portion of the boot algorithm, and perform the remaining portion of the boot algorithm in response to the scavenge module reclaiming the amount of memory space from the primary kernel that is sufficient to complete the boot algorithm, and at least a portion of said modules comprise one or more of a set of hardware circuits, a set of programmable hardware devices, and executable code stored on a set of non-transitory computer-readable storage media.

2. The apparatus of claim 1, wherein:
the scavenge module further comprises a compression module that compresses user pages from the primary kernel in response to the amount of reclaimed free memory pages being less than the amount of memory space from the primary kernel that is sufficient to complete the boot algorithm; and the reclaim module is further configured to reclaim memory space for the primary kernel freed-up by the compressed user pages.

3. The apparatus of claim 1, wherein:
the scavenge module further comprises a deduplication module that deduplicates user pages from the primary kernel in response to the amount of reclaimed free memory pages being less than the amount of memory space from the primary kernel that is sufficient to complete the boot algorithm; and
the reclaim module is further configured to reclaim memory space for the primary kernel freed-up by the deduplicated user pages.

4. The apparatus of claim 1, wherein the reclaim module is further configured to reclaim user pages from the primary kernel in response to the amount of reclaimed free memory pages from the primary kernel being less than the amount of memory space from the primary kernel that is sufficient to complete the boot algorithm.

5. The apparatus of claim 1, wherein:
the reclaim module is further configured to reclaim an amount of user pages from the primary kernel;
the scavenge module further comprises a compression module that compresses user pages from the primary kernel in response to the amount of reclaimed free memory pages and the amount of reclaimed user pages being less than the amount of memory space from the primary kernel that is sufficient to complete the boot algorithm; and
the reclaim module is further configured to reclaim memory space for the primary kernel freed-up by the compressed user pages.

6. The apparatus of claim 1, wherein:
the reclaim module is further configured to reclaim an amount of user pages from the primary kernel;
the scavenge module further comprises a deduplication module that deduplicates user pages from the primary kernel in response to the amount of reclaimed free memory pages and the amount of reclaimed user pages being less than the amount of memory space from the primary kernel that is sufficient to complete the boot algorithm; and
the reclaim module is further configured to reclaim memory space for the primary kernel freed-up by the deduplicated user pages.

7. A method, comprising:
booting, via a processor performing a boot algorithm, a secondary kernel for an operating system (O/S) in response to a primary kernel for the O/S going offline, wherein the secondary kernel is configured to be loaded to a reserved memory area;
reclaiming memory space from the primary kernel for use in booting the secondary kernel in response to a determination that the reserved memory area includes insufficient memory space for completing the boot algorithm reclaiming an amount of memory space from the primary kernel that is sufficient to complete the boot algorithm;
performing a portion of the boot algorithm;
determining that the reserved memory area includes insufficient memory space for performing a remaining portion of the boot algorithm; and
performing the remaining portion of the boot algorithm in response to reclaiming the amount of memory space from the primary kernel that is sufficient to complete the boot algorithm, wherein reclaiming the amount of memory space from the primary kernel comprises reclaiming an amount of free memory pages from the primary kernel.

8. The method of claim 7, further comprising:
compressing user pages from the primary kernel in response to the amount of reclaimed free memory pages being less than the amount of memory space from the primary kernel that is sufficient to complete the boot algorithm; and
reclaiming memory space for the primary kernel freed-up by the compressed user pages.

9. The method of claim 7, further comprising:
deduplicating user pages from the primary kernel in response to the amount of reclaimed free memory pages being less than the amount of memory space from the primary kernel that is sufficient to complete the boot algorithm; and
reclaiming memory space for the primary kernel freed-up by the deduplicated user pages.

10. The method of claim 7, further comprising:
reclaiming user pages from the primary kernel in response to the amount of reclaimed free memory pages from the primary kernel being less than the amount of memory space from the primary kernel that is sufficient to complete the boot algorithm.

11. The method of claim 7, further comprising:
reclaiming an amount of user pages from the primary kernel;
in response to the amount of reclaimed free memory pages and the amount of reclaimed user pages being less than the amount of memory space from the primary kernel that is sufficient to complete the boot algorithm, compressing user pages from the primary kernel; and
reclaiming memory space for the primary kernel freed-up by the compressed user pages.

12. The method of claim 7, further comprising:
reclaiming an amount of user pages from the primary kernel;
in response to the amount of reclaimed free memory pages and the amount of reclaimed user pages being less than the amount of memory space from the primary kernel that is sufficient to complete the boot algorithm, deduplicating user pages from the primary kernel; and
reclaiming memory space for the primary kernel freed-up by the deduplicated user pages.

13. A computer program product comprising a non-transitory computer-readable storage medium including program instructions embodied therewith, the program instructions executable by a processor to cause the processor to:
boot, via a boot algorithm, a secondary kernel for an operating system (O/S) in response to a primary kernel for the O/S going offline, wherein the secondary kernel is configured to be loaded to a reserved memory area;
reclaim memory space from the primary kernel for use in booting the secondary kernel in response to a determination that the reserved memory area includes insufficient memory space for completing the boot algorithm reclaim an amount of memory space from the primary kernel that is sufficient to complete the boot algorithm;
perform a portion of the boot algorithm;
determine that the reserved memory area includes insufficient memory space for performing a remaining portion of the boot algorithm; and
perform the remaining portion of the boot algorithm in response to reclaiming the amount of memory space from the primary kernel that is sufficient to complete the boot algorithm, wherein the program instructions causing the processor to reclaim the amount of memory space from the primary kernel further causes the processor to reclaim an amount of free memory pages from the primary kernel.

14. The computer program product of claim 13, wherein the program instructions further cause the processor to:
    compress user pages from the primary kernel in response to the amount of reclaimed free memory pages being less than the amount of memory space from the primary kernel that is sufficient to complete the boot algorithm; and
    reclaim memory space for the primary kernel freed-up by the compressed user pages.

15. The computer program product of claim 13, wherein the program instructions further cause the processor to:
    deduplicate user pages from the primary kernel in response to the amount of reclaimed free memory pages being less than the amount of memory space from the primary kernel that is sufficient to complete the boot algorithm; and
    reclaim memory space for the primary kernel freed-up by the deduplicated user pages.

16. The computer program product of claim 13, wherein the program instructions further cause the processor to:
    reclaim user pages from the primary kernel in response to the amount of reclaimed free memory pages from the primary kernel being less than the amount of memory space from the primary kernel that is sufficient to complete the boot algorithm.

17. The computer program product of claim 13, wherein the program instructions further cause the processor to:
    reclaim an amount of user pages from the primary kernel;
    compress user pages from the primary kernel in response to the amount of reclaimed free memory pages and the amount of reclaimed user pages being less than the amount of memory space from the primary kernel that is sufficient to complete the boot algorithm; and
    reclaim memory space for the primary kernel freed-up by the compressed user pages.

18. The computer program product of claim 13, wherein the program instructions further cause the processor to:
    reclaim an amount of user pages from the primary kernel;
    deduplicate user pages from the primary kernel in response to the amount of reclaimed free memory pages and the amount of reclaimed user pages being less than the amount of memory space from the primary kernel that is sufficient to complete the boot algorithm; and
    reclaim memory space for the primary kernel freed-up by the deduplicated user pages.

\* \* \* \* \*